United States Patent
Gao et al.

(10) Patent No.: US 12,494,884 B2
(45) Date of Patent: Dec. 9, 2025

(54) METHOD AND APPARATUS FOR PROCESSING HARQ OF SPS PDSCH AND ELECTRONIC DEVICE

(71) Applicant: DATANG MOBILE COMMUNICATIONS EQUIPMENT CO., LTD., Beijing (CN)

(72) Inventors: Xuejuan Gao, Beijing (CN); Qianqian Si, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 543 days.

(21) Appl. No.: 17/775,266

(22) PCT Filed: Sep. 3, 2020

(86) PCT No.: PCT/CN2020/113179
§ 371 (c)(1),
(2) Date: May 6, 2022

(87) PCT Pub. No.: WO2021/088494
PCT Pub. Date: May 14, 2021

(65) Prior Publication Data
US 2022/0399978 A1    Dec. 15, 2022

(30) Foreign Application Priority Data

Nov. 8, 2019  (CN) .......................... 201911089886.0
Nov. 19, 2019 (CN) .......................... 201911136319.6

(51) Int. Cl.
*H04L 5/00* (2006.01)

(52) U.S. Cl.
CPC ................................. *H04L 5/0055* (2013.01)

(58) Field of Classification Search
CPC ...................................................... H04L 5/0055
(Continued)

(56) References Cited

U.S. PATENT DOCUMENTS

2017/0273056 A1    9/2017  Papasakellariou
2018/0278373 A1    9/2018  Wang et al.
(Continued)

FOREIGN PATENT DOCUMENTS

CN    108633070 A    10/2018
CN    110149173 A    8/2019
(Continued)

OTHER PUBLICATIONS

Wilus Inc., On SPS PDSCH for NR URLLC, R1-1909371, 3GPP TSG RAN WG1 #98, Prague, CZ, Aug. 26-30, 2019 (Year: 2019).*
(Continued)

*Primary Examiner* — Nicholas R Taylor
*Assistant Examiner* — Chong G Kim
(74) *Attorney, Agent, or Firm* — KILPATRICK TOWNSEND & STOCKTON LLP

(57) ABSTRACT

Embodiments of the present application provide a method and an apparatus for processing the HARQ of an SPS PDSCH, and electronic device. In case that a PUCCH resource carrying the HARQ-ACK of an SPS PDSCH in a time unit determined according to K1 corresponding to the SPS PDSCH is not available, the HARQ-ACK of the SPS PDSCH is deferred to a target time unit for transmission to avoid discarding the HARQ-ACK of the SPS PDSCH as much as possible.

16 Claims, 6 Drawing Sheets

Determining an initial time unit in which a first hybrid automatic repeat request-acknowledge character (HARQ-ACK) transmission of a first semi-persistent scheduling (SPS) physical downlink shared channel (PDSCH) is present — 201

Determining whether an unavailable symbol is included in a symbol set corresponding to a first physical uplink control channel (PUCCH) resource for carrying the first HARQ-ACK in the initial time unit — 202

Deferring, in case that an unavailable symbol is included, the first HARQ-ACK to a target time unit and processing the first HARQ-ACK in the target time — 203

(58) Field of Classification Search
USPC .......................................................... 370/329
See application file for complete search history.

(56) References Cited

U.S. PATENT DOCUMENTS

| | | | | |
|---|---|---|---|---|
| 2018/0279274 A1* | 9/2018 | Sun | ...................... | H04W 52/367 |
| 2020/0374089 A1* | 11/2020 | Yang | ...................... | H04L 5/0053 |
| 2021/0021382 A1* | 1/2021 | Chien | ................... | H04L 1/1861 |
| 2021/0037516 A1* | 2/2021 | Lyu | ....................... | H04L 1/1864 |
| 2022/0095337 A1* | 3/2022 | Wang | ..................... | H04L 5/0053 |
| 2025/0219769 A1* | 7/2025 | Lei | ........................ | H04L 1/1854 |

FOREIGN PATENT DOCUMENTS

| | | | | | |
|---|---|---|---|---|---|
| CN | 112351499 A | * | 2/2021 | ............ | H04W 72/23 |
| CN | 112787787 B | | 7/2022 | | |

OTHER PUBLICATIONS

European Patent Office, Extended European Search Report Issued in Application No. 20884291.4, Sep. 21, 2023, Germany, 11 pages.
Wilus Inc., "On SPS PDSCH for NR URLLC", 3GPP TSG RAN WG1 #98, Prague, CZ, Aug. 26-30, 2019, total 4 pages, R1-1909371.
Intel Corporation,"Some remaining details on DL/UL scheduling and HARQ management", 3GPP TSG RAN WG1 Meeting #92bis, Sanya, P.R. China, Apr. 16-20, 2018, total 5 pages, R1-1804733.
Sony, "UCI enhancements for eURLLC", 3GPP TSG RAN WG1 #97, Reno, USA, May 13-17, 2019, total 5 pages, R1-1906841.

* cited by examiner

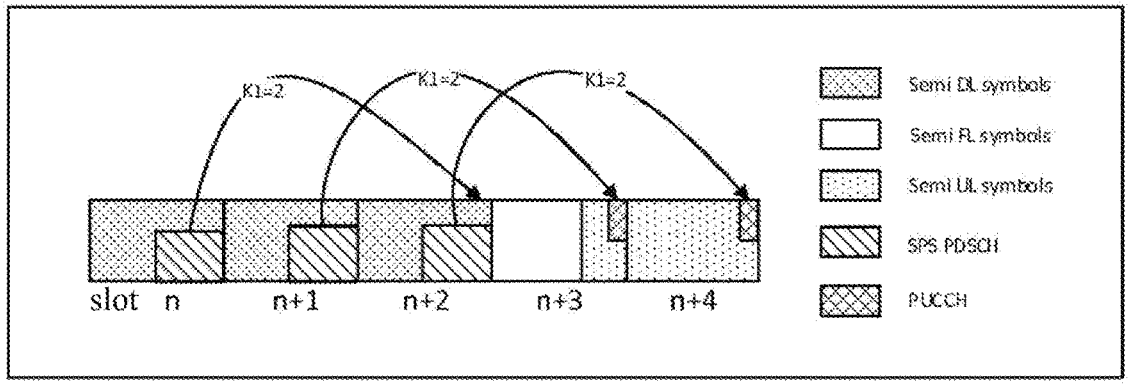

FIG. 1

| Determining an initial time unit in which a first hybrid automatic repeat request-acknowledge character (HARQ-ACK) transmission of a first semi-persistent scheduling (SPS) physical downlink shared channel (PDSCH) is present | 201 |

| Determining whether an unavailable symbol is included in a symbol set corresponding to a first physical uplink control channel (PUCCH) resource for carrying the first HARQ-ACK in the initial time unit | 202 |

| Deferring, in case that an unavailable symbol is included, the first HARQ-ACK to a target time unit and processing the first HARQ-ACK in the target time | 203 |

FIG. 2

METHOD AND APPARATUS FOR PROCESSING HARQ OF SPS PDSCH AND ELECTRONIC DEVICE

CROSS-REFERENCE TO RELATED APPLICATIONS

The present application is a US National Stage of International Application No. PCT/CN2020/113179, filed on Sep. 3, 2020, which claims priority to Chinese application No. 201911089886.0 filed on Nov. 8, 2019, entitled "Method and Apparatus for Processing HARQ of SPS PDSCH and Electronic Device", and Chinese application No. 201911136319.6 filed on Nov. 19, 2019, entitled "Method and Apparatus for Processing HARQ of SPS PDSCH and Electronic Device", which are hereby incorporated by reference in their entireties.

FIELD

The present application relates to the field of communication, and in particular, to a method and an apparatus for processing HARQ of SPS PDSCH and an electronic device.

BACKGROUND

In the 5G (5th generation mobile networks) new radio (NR) system, a semi-persistent scheduling (SPS) physical downlink shared channel (PDSCH) transmission and a dynamic PDSCH transmission with a corresponding physical downlink control channel (PDCCH), that is, PDSCH is scheduled for transmission by a PDCCH are supported In NR Rel-15, only one Hybrid Automatic Repeat Request-Acknowledge Character (HARQ-ACK) feedback information of a SPS PDSCH is allowed to be transmitted in a PUCCH. However, Rel-16 will support shorter SPS PDSCH transmission periods, e.g., transmission periods in a unit of slots. For time division duplexing (TDD) scenarios, since only one K1 value (that is, the HARQ-ACK Timing value) can be indicated in the activated DCI (Downlink Control Information) of the SPS PDSCH, PUCCH resources corresponding to the HARQ-ACK feedback of the SPS PDSCH conflict with downlink (DL) symbols or unavailable flexible (FL) symbols (For example, scalable Serializer-Deserializer (SerDes) framer interface (SFI) is indicated as DL symbols or FL symbols scheduled by DCI for downlink transmission) in some transmission opportunities, which results in that the HARQ feedback of SPS PDSCH transmission with a short period will be discarded excessively. At present, there is no clear method to transmit HARQ-ACK of SPS PDSCH with a short period.

SUMMARY

Embodiments of the present application provide a method and an apparatus for processing HARQ of SPS PDSCH and an electronic device, which can solve a problem that a HARQ feedback of SPS PDSCH transmission with a short period is discarded excessively in the related art.

According to a first aspect of the present application, a method for processing HARQ of SPS PDSCH is provided, which includes:
  determining an initial time unit in which a first hybrid automatic repeat request-acknowledge character (HARQ-ACK) transmission of a first semi-persistent scheduling (SPS) physical downlink shared channel (PDSCH) is present;
  determining whether an unavailable symbol is included in a symbol set corresponding to a first physical uplink control channel (PUCCH) resource for carrying the first HARQ-ACK in the initial time unit; and
  deferring, in case that an unavailable symbol is included, the first HARQ-ACK to a target time unit and processing the first HARQ-ACK in the target time.

According to a second aspect of the present application, a method for processing HARQ of SPS PDSCH is provided, which includes:
  determining an initial time unit in which a first HARQ-ACK transmission of a first SPS PDSCH is present;
  determining whether an unavailable symbol is included in a symbol set corresponding to a first PUCCH resource for carrying the first HARQ-ACK in the initial time unit; and
  deferring, in case that an unavailable symbol is included, the first HARQ-ACK to a target time unit, and receiving the first HARQ-ACK in the target time.

According to a third aspect of the present application, an apparatus for processing HARQ of SPS PDSCH is provided, which includes:
  a first determining module configured to determine an initial time unit in which a first hybrid automatic repeat request-acknowledge character (HARQ-ACK) transmission of a first semi-persistent scheduling (SPS) physical downlink shared channel (PDSCH) is present;
  a first judging module configured to determine whether an unavailable symbol is included in a symbol set corresponding to a first physical uplink control channel (PUCCH) resource for carrying the first HARQ-ACK in the initial time unit; and
  a first deferring and processing device, configured to defer, in case that an unavailable symbol is included, the first HARQ-ACK to a target time unit and process the first HARQ-ACK in the target time.

According to a fourth aspect of the present application, an apparatus for processing HARQ of SPS PDSCH is provided, which includes:
  a second determining module configured to determine an initial time unit in which a first HARQ-ACK transmission of a first SPS PDSCH is present;
  a second judging module configured to determine whether an unavailable symbol is included in a symbol set corresponding to a first PUCCH resource for carrying the first HARQ-ACK in the initial time unit; and
  a second deferring and processing device, configured to defer, in case that an unavailable symbol is included, the first HARQ-ACK to a target time unit, and receive the first HARQ-ACK in the target time.

According to a fifth aspect of the present application, a terminal is provided, which includes a processor, and a memory storing programs that are executable by the processor. The programs, in case that executed by the processor, cause the processor to implement the following steps:
  determining an initial time unit in which a first hybrid automatic repeat request-acknowledge character (HARQ-ACK) transmission of a first semi-persistent scheduling (SPS) physical downlink shared channel (PDSCH) is present;
  determining whether an unavailable symbol is included in a symbol set corresponding to a first physical uplink control channel (PUCCH) resource for carrying the first HARQ-ACK in the initial time unit; and
  deferring, in case that an unavailable symbol is included, the first HARQ-ACK to a target time unit and processing the first HARQ-ACK in the target time.

According to a sixth aspect of the present application, a terminal is provided, which includes a processor, and a memory storing programs that are executable by the processor. The programs, in case that executed by the processor, cause the processor to implement the following steps:

determining an initial time unit in which a first HARQ-ACK transmission of a first SPS PDSCH is present;

determining whether an unavailable symbol is included in a symbol set corresponding to a first PUCCH resource for carrying the first HARQ-ACK in the initial time unit; and deferring, in case that an unavailable symbol is included, the first HARQ-ACK to a target time unit, and receiving the first HARQ-ACK in the target time.

According to a seventh aspect of the present application, a non-transitory computer-readable storage medium having stored thereon computer programs is provided, the computer programs, in case that executed by the processor, cause the processor to implement steps of the method for processing HARQ of SPS PDSCH mentioned above.

According to the method and apparatus for processing HARQ of SPS PDSCH and the electronic device, in case that the PUCCH resource for carrying the HARQ-ACK of the SPS PDSCH in the time unit determined according to a corresponding K1 of the SPS PDSCH is unavailable, the HARQ-ACK of SPS PDSCH is deferred into a target time unit for being transmitted, which may avoid discarding the HARQ-ACK of SPS PDSCH as much as possible.

BRIEF DESCRIPTION OF THE DRAWINGS

In order to more clearly illustrate the embodiments of the present application, the drawings used in the descriptions of the embodiments will be briefly described below. The drawings in the following description are only certain embodiments of the present application, and other drawings can be obtained according to the drawings.

FIG. 1 is a schematic diagram of determining a slot where HARQ-ACK is transmitted based on DCI according to an embodiment of the present application;

FIG. 2 is a schematic flowchart of a method for processing HARQ of SPS PDSCH on a terminal side according to another embodiment of the present application;

DETAILED DESCRIPTION

Figure 3:
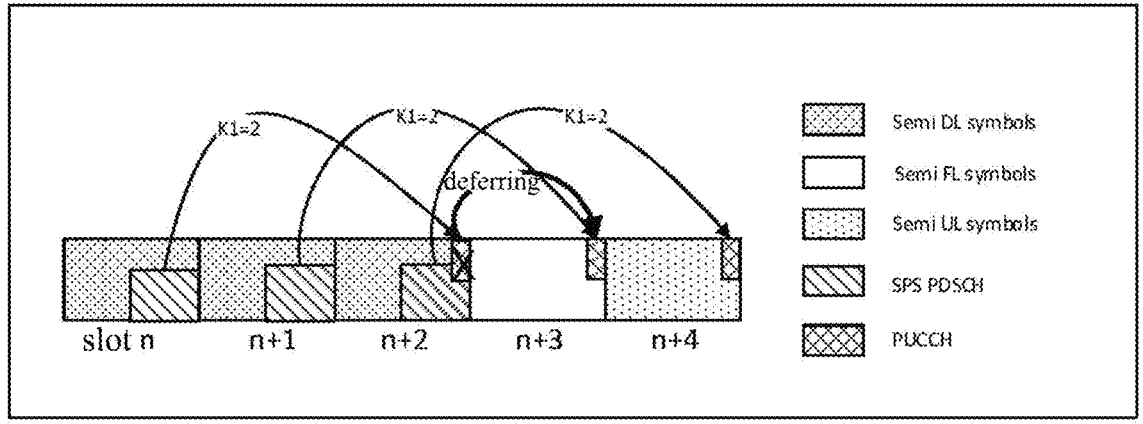
FIG. 3 is a schematic diagram of a slot in which HARQ-ACK is deferred according to another embodiment of the present application.

The embodiments of the present application more clear, the technical solutions in the embodiments of the present application are clearly and completely described in the following with reference to the accompanying drawings in the embodiments of the present application. These embodiments are a part of the embodiments of the present application, and not all of the embodiments.

Before a method for processing HARQ of SPS PDSCH is described according to the present embodiment, the relevant background knowledge is introduced:

In the 5G NR system, in case that SPS transmission is configured, a high layer signaling will configure a radio network temporary identity (RNTI, such as CS-RNTI) corresponding to the SPS, which scrambles a PDCCH for activating and deactivating the SPS transmission, and the high layer signaling will also configure an SPS PDSCH transmission period accordingly. In case that the SPS transmission needs to be performed due to business requirements, the base station can activate a terminal to perform SPS transmission according to the period configured by the SPS by sending an activating PDCCH, where the activating PDCCH includes related scheduling information such as frequency domain resource allocation, time domain resource allocation, MCS, etc. for determining the transmission opportunity of the SPS PDSCH.

The high layer signaling pre-configures, for the terminal, N candidate HARQ-ACK timing values (that is, K1 values, which represent time intervals between a PDSCH or SPS release PDCCH and the PUCCH that transmits its HARQ-ACK feedback information, such as slot or subslots), where N ranges from 1 to 8. The HARQ-ACK timing of the PDSCH with corresponding PDCCH indicates any one of the N values preconfigured by the higher layer signaling by the $\lceil \log\_2 (N) \rceil$ bit HARQ-ACK timing indication field in the PDCCH. For SPS PDSCH, since corresponding PDCCH is present, the HARQ-ACK timing of SPS PDSCH is determined by the HARQ-ACK timing indication field in the PDCCH that activates SPS PDSCH transmission. In each SPS transmission opportunity corresponding to an SPS transmission, the SPS PDSCH uses the same K1 value to determine a time domain location for transmitting its HARQ-ACK feedback.

For PDSCH transmission with PDCCH, a PUCCH resource used for HARQ-ACK feedback is determined based on a PUCCH resource indication (PRI) information field in the PDCCH. Specifically, the high layer signaling can pre-configure one to four PUCCH resource sets for the terminal. Different PUCCH resource sets correspond to different ranges of number of bits in UCI transmission. The terminal may select a PUCCH resource set based on a total number of bits of UCI to be transmitted. Each PUCCH resource set can contain PUCCH resources. In the PUCCH resource set determined based on the number of bits in UCI transmission, one of the PUCCH resource set may be further determined by a 3-bit PRI in the PDCCH (in combination with the CCE index of the PDCCH in case that the number of PUCCH resources in the PUCCH resource set is greater than 8) for performing UCI transmission. For SPS PDSCH transmission, the PUCCH resource is determined based on the method above if a corresponding HARQ-ACK and the HARQ-ACK corresponding to the PDSCH transmission with PDCCH are transmitted in the same PUCCH (for example, determined to be transmitted in the same slot or sub-slot according to K1). If there is only HARQ-ACK feedback of the SPS PDSCH in a PUCCH, since there is no corresponding PDCCH, the PUCCH resource cannot be determined by using the PRI in the PDCCH, and high layer signaling can be used to configure a dedicated PUCCH resource for the SPS PDSCH transmission. In R15, only one SPS transmission can be configured for the same UE. Considering that only one PUCCH supports at most one HARQ-ACK of SPS PDSCH, the PUCCH resource configured for SPS transmission may use PUCCH format 0 or PUCCH format 1. In R16, SPS transmissions may be configured for the same UE, and the HARQ-ACKs of the SPS transmissions may be multiplexed in the same PUCCH for transmission. Therefore, the PUCCH resources configured for SPS can also use PUCCH formats 2, 3 and 4.

There are two configuration methods for the slot structure in NR, one is semi-static configuration, that is, RRC signaling configures the slot included in a period and a transmission direction of each symbol in the slot in a periodic manner, the symbol may be an uplink (DL) symbol, a downlink (UL) symbol and a flexible (FL) symbol. In addition, the terminal can also be configured to detect a DCI format 2-0 scrambled with SFI-RNTI, and the SFI information in the DCI can dynamically change a transmission direction of the semi-statically configured flexible symbols to uplink or downlink. There are provisions as follows.

In case that the detection of DCI format 2-0 scrambled with SFI-RNTI is configured, the transmission is performed based on the indication of DCI format 2-0, and the PUCCH resource corresponding to HARQ-ACK of SPS PDSCH can only be transmitted on a symbol indicated as UL by the DCI format 2-0. If there is a semi-static DL symbol or a symbol scheduled for downlink transmission by DCI or a symbol indicated as DL or flexible by DCI format 2-0 in the symbol set where the PUCCH is located, the PUCCH is discarded and cannot be transmitted.

In case that the detection of DCI format 2-0 scrambled with SFI-RNTI is not configured, the transmission is performed based on the semi-statically configured transmission direction and DCI scheduling, and the PUCCH resource corresponding to the HARQ-ACK of the SPS PDSCH can be transmitted on a symbol semi-statically configured as UL or Flexible. The flexible symbol can only be used in case that there is no downlink transmission (such as PDSCH, PDCCH, CSI-RS, SSB, etc.) scheduled by DCI thereon, otherwise it is considered to be in conflict with DL, and this flexible symbol is also unavailable. If a PUCCH resource carrying the HARQ-ACK of the SPS PDSCH collides with a semi-statically configured DL symbol or a flexible symbol for DCI scheduling downlink transmission, this PUCCH is discarded and cannot be transmitted.

In case that there is a SPS PDSCH configuration in NR Rel-16, a slot offset K1 between the SPS PDSCH transmission and the corresponding HARQ-ACK feedback position is indicated by an activating DCI, and only one K1 value can be indicated in the activating DCI. In case that the SPS PDSCH transmission in SPS PDSCH transmission opportunities, determined by the periodic activation signaling corresponding to the same SPS configuration, uses the same K1 value to determine a time domain position (such as a slot or subslot) of the HARQ-ACK feedback, for TDD scenarios, considering different uplink and downlink ratios, there may be some cases where the PUCCH resources where the HARQ-ACK feedback transmission of some SPS PDSCHs are located overlap with the downlink symbols, and these SPS PDSCHs cannot perform normal HARQ-ACK feedback. The HARQ-ACK of the short-period SPS PDSCH is discarded excessively, and the effect of shortening the deferring provided by the short-period SPS transmission cannot be achieved. FIG. 1 is a schematic diagram of determining a slot where HARQ-ACK is transmitted based on DCI according to an embodiment of the present application. As shown in FIG. 1, the transmission period of the SPS PDSCH is 1 slot. In case that the value of K1 indicated in the activating DCI is 2, the HARQ-ACK feedback information of the SPS PDSCH in the slot n needs to be transmitted in the slot n+2, but the slot n+2 is a downlink slot, the user equipment (UE) discards the HARQ-ACK feedback information of the SPS PDSCH in the related art.

Therefore, in the traditional method, in case that the UE feeds back the HARQ-ACK, a time unit for feeding back the HARQ-ACK is only determined based on the K1 value fed back by the DCI, HARQ-ACK will be discarded in case that an unavailable symbol is present in the determined time unit and excessively discarding HARQ-ACK cannot provide the effect of shortening the deferring for short-period SPS transmission. With respect to this problem, FIG. 2 is a schematic flowchart of a method for processing HARQ of SPS PDSCH on a terminal side according to another embodiment of the present application. The method is executed by the terminal. Referring to FIG. 2, the method includes the following steps:

Step 201, determining an initial time unit in which a first hybrid automatic repeat request-acknowledge character (HARQ-ACK) transmission of a first semi-persistent scheduling (SPS) physical downlink shared channel (PDSCH) is present.

In the step 201, the terminal may determine the initial time unit in which the PUCCH carrying the HARQ-ACK of the SPS PDSCH is located based on K1 corresponding to the first SPS PDSCH.

Step 202, determining whether an unavailable symbol is included in a symbol set corresponding to a first physical uplink control channel (PUCCH) resource for carrying the first HARQ-ACK in the initial time unit; and In the step 202, the terminal may determine, based on the PUCCH resource corresponding to the first SPS PDSCH, a symbol set in the initial time unit in which the PUCCH carrying the HARQ-ACK of SPS PDSCH is located.

In this step, the first PUCCH resource is a PUCCH resource determined from PUCCH resources corresponding to the SPS PDSCH based on the number of bits of the first HARQ-ACK, for example, 2 PUCCH resources are configured for the SPS PDSCH, and PUCCH resource 1 is configured to transmit 1 to 2 bits of SPS HARQ-ACK, and PUCCH resource 2 is configured to transmit more than 2 bits of SPS HARQ-ACK, then the first PUCCH resource is determined to be PUCCH resource 1.

Step 203, deferring, in case that an unavailable symbol is included, the first HARQ-ACK to a target time unit and processing the first HARQ-ACK.

In this step, the terminal determines whether an unavailable symbol is included in the determined symbol set, and the first HARQ-ACK of the first SPS PDSCH is deferred to a target time unit for being transmitted in case that an unavailable symbol is included.

In this method, the terminal defers the first HARQ-ACK to the target time unit, and discards or transmits the first SPS PDSCH to the base station in the target time unit. Compared with the method of processing the first SPS PDSCH only through the initial time unit indicated by the DCI, by the method according to the present embodiment, the possibility of realizing the transmission of the first SPS PDSCH is increased and the possibility that the first SPS PDSCH is discarded is reduced, to be beneficial to provide the effect of shortening the deferring for short-period SPS transmission.

Further, the method further includes determining the target time unit based on one of the following ways:

way 1: taking a time unit immediately subsequent to the initial time unit as the target time unit;

way 2: taking an earliest time unit in which a UCI transmission occurs subsequent to the initial time unit as the target time unit; or, taking an earliest time unit in which a UCI transmission overlapping with the first PUCCH resource occurs subsequent to the initial time unit as the target time unit;

way 3: taking an earliest time unit in which a second HARQ-ACK corresponding to a second SPS PDSCH is transmitted subsequent to the initial time unit as the target time unit, and the second SPS PDSCH and the first SPS PDSCH correspond to a same SPS configuration, or correspond to different SPS configurations;

way 4: taking an earliest time unit subsequent to the initial time unit, which satisfies that an unavailable symbol is not included in a PUCCH resource for carrying the first HARQ-ACK, as the target time unit;

way 5: taking an earliest time unit in which no UCI transmission is present subsequent to the initial time unit as the target time unit; or, taking an earliest time unit in which no UCI transmission overlapping with the first PUCCH resource is present subsequent to the initial time unit as the target time unit; and way 6: taking an earliest time unit subsequent to the initial time unit, which satisfies that a UCI transmission is absent and an unavailable symbol is not included in a PUCCH resource for carrying the first HARQ-ACK, as the target time unit; or, taking an earliest time unit subsequent to the initial time unit, which satisfies that no UCI transmission overlapping with the first PUCCH resource is present and the unavailable symbol is not included in a PUCCH resource for carrying the first HARQ-ACK as the target time unit.

Further, in case that the way 1 is adopted, the processing the first HARQ-ACK in the target time unit includes:

in case that the UCI transmission or the UCI transmission overlapping with the first PUCCH resource is present in the target time unit, transmitting the first HARQ-ACK and the UCI in the target time unit simultaneously;

in case that the UCI transmission or the UCI transmission overlapping with the first PUCCH resource is absent in the target time unit, adopting one of the following schemes:

scheme 1: discarding the first HARQ-ACK;

scheme 2: transmitting the first HARQ-ACK through the first PUCCH resource in the target time unit; and scheme 3: determining whether an unavailable symbol is included in a symbol set corresponding to the first PUCCH resource in the target time unit; and discarding the first HARQ-ACK in case that the unavailable symbol is included and transmitting the first HARQ-ACK through the first PUCCH resource in the target time unit in case that the unavailable symbol is not included.

Specifically, the target time unit determined by way 1 is the time unit immediately subsequent to the initial time unit. The processing the first HARQ-ACK in the target time unit includes:

discarding the HARQ-ACK of SPS PDSCH without transmitting or transmitting SPS PDSCH on the PUCCH resource corresponding to the SPS PDSCH in the target time unit in case that a UCI transmission or a UCI transmission overlapping with the first PUCCH resource corresponding to the SPS PDSCH is absent in the target time unit; or determining whether an unavailable symbol is included in a symbol set corresponding to the PUCCH resource corresponding to the SPS PDSCH in the target time unit; discarding the SPS PDSCH without transmitting in case that the unavailable symbol is included and transmitting the SPS PDSCH on the PUCCH resource corresponding to the SPS PDSCH in the target time unit in case that the unavailable symbol is not included; and performing multiplexing transmission on the SPS PDSCH and the UCI based on a predetermined scheme in case that the UCI transmission or the UCI transmission overlapping with the first PUCCH resource corresponding to the SPS PDSCH is present in the target time unit.

Further, in case that the way 2 is adopted, the processing the first HARQ-ACK in the target time unit includes:

transmitting the first HARQ-ACK and the UCI simultaneously in the target time unit.

Specifically, the target time unit determined by way 2 is an earliest time unit in which a UCI transmission occurs; or in which a UCI transmission overlapping with a PUCCH resource corresponding to the SPS PDSCH occurs subsequent to the initial time unit. The processing the first HARQ-ACK in the target time unit includes:

performing multiplexing transmission on the SPS PDSCH and the UCI based on a predetermined scheme.

Further, in case that the way 3 is adopted, the processing the first HARQ-ACK in the target time unit includes:

selecting, based on a total number of bits of the first HARQ-ACK and a second HARQ-ACK, a PUCCH resource from PUCCH resources corresponding to SPS PDSCH, and transmitting the first HARQ-ACK and the second HARQ-ACK simultaneously on the selected PUCCH resource.

It should be noted for the above-mentioned "PUCCH resources corresponding to SPS PDSCH" that for one or more SPS configurations, one or more PUCCH resources can be pre-configured by high layer signaling to carry the transmission of HARQ_ACK of SPS DPSCH. These PUCCH resources are usually used only in case that transmission of HARQ-ACK of SPS PDSCH is present. Different PUCCH resources correspond to different of number of bits in transmission of HARQ_ACK of SPS DPSCH. A resource can be determined based on the number of bits to transmit all HARQ-ACKs of SPS PDSCH that need to be transmitted at the same time in the current time unit. The selected PUCCH resource may be the same or different from the first PUCCH resource; for example, 2 PUCCH resources are configured, PUCCH resource 1 is used to carry 1 to 2 bits of transmission, PUCCH resource 2 is used to carry more than 2 bits of transmission. in the initial time unit, according to the above definition, the first PUCCH resource is determined as PUCCH resource 1 only based on the number of bits of the first HARQ-ACK, while in the target time unit, the determining the PUCCH resource depends on how many second HARQ-ACK, if there is only 1-bit second HARQ-ACK, then the determined PUCCH resource is still PUCCH resource 1; and if there is more than 1-bit second HARQ-ACK, then the determined PUCCH resource is PUCCH resource 2.

It should be noted that the above "transmitting the first HARQ-ACK and the second HARQ-ACK on the selected PUCCH resource simultaneously" is that the first HARQ-ACK and the UCI are simultaneously transmitted in case that a UCI transmission overlapping with the first PUCCH resource is present in the target time unit.

Specifically, the target time unit determined by way 3 is an earliest time unit subsequent to the initial time unit in which the HARQ-ACK transmission of SPS PDSCH is present. The processing the first HARQ-ACK in the target time unit includes:

the subsequent SPS PDSCH being an SPS PDSCH corresponding to the same configuration as the SPS PDSCH or an SPS PDSCH corresponding to a different configuration;

selecting, based on a total number of bits of the HARQ-ACK of the SPS PDSCH in the target time unit (including the HARQ-ACK of the SPS PDSCH), a PUCCH resource from PUCCH resources corresponding to SPS PDSCH, and transmitting the HARQ-ACK of SPS PDSCH and a HARQ-ACK of the subsequent SPS PDSCH on the selected PUCCH resource simultaneously.

Further, in case that the way 4 is adopted, the processing the first HARQ-ACK in the target time unit includes one of the following:

scheme A: in case that the PUCCH resource for carrying the first HARQ-ACK is the first PUCCH resource, the processing the first HARQ-ACK in the target time unit includes:
transmitting the first HARQ-ACK through the PUCCH resource in the target time unit; and scheme B: in case that the PUCCH resource for carrying the first HARQ-ACK is a PUCCH resource that is determined from PUCCH resources corresponding to the SPS PDSCH based on a total number of bits of the first HARQ-ACK and the second HARQ-ACK corresponding to the second SPS PDSCH, the processing the first HARQ-ACK in the target time unit includes:
transmitting the first HARQ-ACK and the second HARQ-ACK on the PUCCH resource simultaneously, and the second SPS PDSCH and the first SPS PDSCH correspond to the same SPS configuration, or correspond to different SPS configurations; and scheme C: in case that the PUCCH resource for carrying the first HARQ-ACK is a PUCCH resource for transmitting the UCI, the processing the first HARQ-ACK in the target time unit includes: simultaneously transmitting the first HARQ-ACK and the UCI on the PUCCH resource.

It should be noted for the above "transmitting the first HARQ-ACK through the PUCCH resource in the target time unit" in the scheme A that, the first HARQ-ACK and the UCI are simultaneously transmitted in case that a UCI transmission overlapping with the first PUCCH resource occurs in the target time unit.

It should be noted for the above "transmitting the first HARQ-ACK and the second HARQ-ACK on the PUCCH resource simultaneously" in the scheme B that, if another UCI overlaps with the PUCCH resource, another UCI and all HARQ-ACKs (including the first HARQ-ACK) corresponding SPS PDSCHs on the PUCCH resource are transmitted simultaneously using the same multiplexing and transmission rules as the multiplexing and transmission rule for the first HARQ-ACK and UCI.

Specifically, the target time unit determined by way 3 is the earliest time unit in which the unavailable symbol is not included in PUCCH resources (i.e., valid PUCCH resources) subsequent to the initial time unit. The processing the first HARQ-ACK in the target time unit includes:

in case that the PUCCH resource for carrying the first HARQ-ACK is a PUCCH resource corresponding to the SPS PDSCH (that is, determining whether an unavailable symbol is included in each time unit subsequent to the initial time unit based on a start symbol and a transmission length of the PUCCH resource corresponding to the SPS PDSCH, determining the earliest time unit not including the unavailable symbol as the target time unit, that is, deferring the PUCCH resources time unit by time unit until a time unit satisfying that the unavailable symbol is not included is found), transmitting the HARQ-ACK of the SPS PDSCH through the PUCCH resource corresponding to the SPS PDSCH in the target time unit; or in case that the PUCCH resource for carrying the first HARQ-ACK is a PUCCH selected from PUCCH resources corresponding to SPS PDSCH based on a total number of bits of the HARQ-ACK of the SPS PDSCH and the HARQ-ACK of the SPS PDSCH to be transmitted in the target time unit, transmitting the HARQ-ACK of the SPS PDSCH and the HARQ-ACK of the SPS PDSCH to be transmitted in the target time unit on the selected PUCCH resource simultaneously; or in case that the PUCCH resource for carrying the first HARQ-ACK is a PUCCH resource for transmitting the UCI; performing multiplexing transmission on the SPS PDSCH and the UCI based on a predetermined scheme; where the UCI is any one of HARQ-ACK, CSI, and SR of the PDSCH with corresponding PDCCH.

Further, the UCI includes at least one of the following information: HARQ-ACK of PDSCH with corresponding PDCCH, HARQ-ACK of corresponding second SPS PDSCH, channel state information (CSI), and scheduling request (SR), and the second SPS PDSCH and the first SPS PDSCH correspond to the same SPS configuration, or correspond to different SPS configurations.

A configuration in the SR can correspond to the beam failure request (BFR) (that is, if there is a BFR, the BFR can be considered as a form of SR).

For the above different ways, the UCI may have the same or different definitions. For example, for way 1, the UCI is defined to include the HARQ-ACK of the PDSCH with corresponding PDCCH, the HARQ-ACK of the corresponding SPS PDSCH, the channel state information (CSI) and scheduling request (SR), it means that for way 1, as long as any one of the above UCIs occurs, it is considered that UCI is present. Based on the specific implementation of the UCI, that is, the first HARQ-ACK and the UCI are simultaneously transmitted in the target time unit and transmission is performed for different UCIs based on different simultaneous transmission schemes, which refer to the subsequent definitions for details; for another example, for way 2, the UCI is defined to only include the HARQ-ACK of the PDSCH with corresponding PDCCH, it is considered that the time unit in which the UCI is the HARQ-ACK of the PDSCH with corresponding PDCCH may be used as the target time unit; for another example, for way 2, the UCI is defined to include these semi-static signals, such as HARQ-ACK of a corresponding SPS PDSCH, channel state information (CSI) and scheduling request (SR) and it is considered that the time unit in which the UCI is one of these semi-static signals may be used as the target time unit; for another example, for way 2, the UCI is defined to include the HARQ-ACK of a corresponding PDSCH, it is considered that the time unit in which the UCI is the HARQ-ACK of a corresponding PDSCH may be used as the target time unit; and for another example, in case that the scheme C is used in way 4, the UCI may be defined to only include the HARQ-ACK of the PDSCH with corresponding PDCCH, it is considered that the time unit in which the UCI is the HARQ-ACK of the PDSCH with corresponding PDCCH may be used as the target time unit in case that satisfying other requirements (for example, the PUCCH resource is an available resource and excludes an unavailable symbol); for another example, in case that the scheme C is used in way 4, the UCI is defined to include these semi-static signals, such as HARQ-ACK of a corresponding SPS PDSCH, channel state information (CSI) and scheduling request (SR) and it is considered that the time unit in which the UCI is one of these semi-static signals in case that satisfying other requirements may be used as the target time unit; for another example, in case that the scheme C is used in way 4, the UCI is defined to include the HARQ-ACK of a corresponding PDSCH, it is considered that the time unit in which the UCI is the HARQ-ACK of a corresponding PDSCH in case that satisfying other requirements may be used as the target time unit; and other combinations are not excluded, and will not be repeated.

In case that the UCI includes CSI and/or SR, the PUCCH resource carrying the UCI and the first PUCCH resource have overlapping symbols.

Specifically, for way 1, way 2, and way 4, the UCI includes: at least one of HARQ-ACK, CSI, and SR;
the HARQ-ACK includes at least one of the HARQ-ACK of the PDSCH with corresponding PDCCH and the HARQ-ACK of the SPS PDSCH, and the SPS PDSCH is an SPS PDSCH having the same configuration as the SPS PDSCH or a different configuration from the SPS PDSCH; and
in case that only at least one of CSI and SR is included, the PUCCH resource carrying the UCI and the PUCCH resource corresponding to the SPS PDSCH have overlapping symbols.

Further, the transmitting the first HARQ-ACK and the UCI simultaneously includes at least one of the following schemes:
in case that the UCI includes a HARQ-ACK of the PDSCH with the corresponding physical downlink control channel (PDCCH), determining a PUCCH resource set based on a total number of bits of the first HARQ-ACK and the UCI, determining a PUCCH resource from the determined PUCCH resource set based on a PUCCH resource indication field in the PDCCH and transmitting the first HARQ-ACK and the UCI through the determined PUCCH resource simultaneously;
in case that the UCI includes only CSI, transmitting the first HARQ-ACK and the CSI simultaneously on a PUCCH resource corresponding to the CSI, or determining a PUCCH resource from PUCCH resources corresponding to SPS PDSCH based on a total number of bits of the first HARQ-ACK and the CSI, and transmitting the first HARQ-ACK and the CSI through the determined PUCCH resource simultaneously;
in case that the UCI includes only CSI and SR, transmitting the first HARQ-ACK, the CSI and the SR simultaneously on a PUCCH resource corresponding to the CSI, or determining a PUCCH resource from PUCCH resources corresponding to SPS PDSCH based on a total number of bits of the first HARQ-ACK, the CSI and the SR, and transmitting the first HARQ-ACK, the CSI and the SR through the determined PUCCH resource simultaneously;
in case that the UCI includes only SR, processing the first HARQ-ACK based on PUCCH formats used by the SR and the first HARQ-ACK, or determining a PUCCH resource from PUCCH resources corresponding to SPS PDSCH based on a total number of bits of the first HARQ-ACK and the SR, and transmitting the first HARQ-ACK and the SR through the determined PUCCH resource simultaneously; and
in case that the UCI only includes the second HARQ-ACK corresponding to the second SPS PDSCH, determining a PUCCH resource from PUCCH resources corresponding to SPS PDSCH based on a total number of bits of the first HARQ-ACK and the second HARQ-ACK and transmitting the first HARQ-ACK and the second HARQ-ACK through the determined PUCCH resource simultaneously.

Further, the processing the first HARQ-ACK based on PUCCH formats used by the SR and the first HARQ-ACK includes:
in case that the PUCCH formats used by both the SR and the first HARQ-ACK is a first format, transmitting the first HARQ-ACK through the SR resource in case that the SR is positive, and transmitting the first HARQ-ACK through a PUCCH resource corresponding to the first SPS PDSCH in case that the SR is negative;
in case that the PUCCH format used by the first HARQ-ACK is a second format, transmitting the first HARQ-ACK through the PUCCH resource corresponding to the first SPS PDSCH, and a cyclic shift used in the first HARQ-ACK transmission is determined based on whether the SR is positive or negative;
in case that the PUCCH format used by the first HARQ-ACK is the first format and the PUCCH format used by the SR is the second format, discarding the SR and transmitting the first HARQ-ACK through the PUCCH resource corresponding to the first SPS PDSCH; and
the first format is PUCCH format 1, and the second format is PUCCH format 0.

It should be noted that, for multiplexing transmission, in case that simultaneous transmission of SR and the first HARQ-ACK occurs, SR is X bits, and X is the number of SR configurations that overlap with the PUCCH resource corresponding to the SPS PDSCH.

Specifically, for way 1, way 2, and way 4, the performing multiplexing transmission on the SPS PDSCH and the UCI based on a predetermined scheme specifically includes:
in case that the UCI includes the HARQ-ACK of the PDSCH with corresponding PDCCH, determining a PUCCH resource set based on a total number of bits of the first HARQ-ACK of the PDSCH and the UCI, determining a PUCCH resource from the determined PUCCH resource set based on a PUCCH resource indication field in the PDCCH and transmitting the HARQ-ACK of the PDSCH and the UCI through the determined PUCCH resource simultaneously;
in case that the UCI contains only CSI, or contains both CSI and SR,
transmitting the HARQ-ACK of the SPS PDSCH and the CSI, or the CSI and the SR simultaneously though the PUCCH resource corresponding to the CSI; or
transmitting, based on a total number of bits of CSI or CSI and SR, and HARQ-ACK of SPS PDSCH, a PUCCH resource through the PUCCH resource corresponding to SPS PDSCH, and transmitting the HARQ-ACK of the SPS PDSCH ACK and the CSI, or CSI and SR simultaneously through the selected PUCCH resource;

in case that the UCI contains only SR, determining the transmission scheme based on PUCCH formats used by the SR and the HARQ-ACK of the SPS PDSCH: in case that both the HARQ-ACK of the SPS PDSCH and the SR use PUCCH format 1, in case that the SR is positive, transmitting the SPS PDSCH using the SR resource and in case that the SR is negative, transmitting the HARQ-ACK of the SPS PDSCH through the PUCCH resource corresponding to the SPS PDSCH; in case that the HARQ-ACK of the SPS PDSCH uses PUCCH format 0, selecting a corresponding cyclic shift set based on the state (positive or negative) of the SR through the PUCCH resource corresponding to the SPS PDSCH to transmit the HARQ-ACK of the SPS PDSCH; or selecting a PUCCH resource from PUCCH resources corresponding to SPS PDSCH based on a total number of bits of the HARQ-ACK of the SR and the SPS PDSCH, and transmitting the HARQ-ACK of the SPS PDSCH and the SR simultaneously through the selected PUCCH resource where SR is X bits, and X is the number of SR configurations that overlap with the PUCCH resource corresponding to the SPS PDSCH.

In addition, in the multiplexing transmission based on the predetermined scheme, there is a multiplexing transmission only applicable to the above way 1. The multiplexing transmission includes: in case that the UCI is only the HARQ-ACK of the SPS PDSCH, selecting a PUCCH resource from PUCCH resources corresponding to SPS PDSCH based on a total number of bits of the HARQ-ACK of SPS PDSCH and a HARQ-ACK of a corresponding SPS PDSCH to be fed back in the target time unit and transmitting the HARQ-ACK of SPS PDSCH and a HARQ-ACK of a corresponding SPS PDSCH to be fed back in the target time unit simultaneously through the selected PUCCH resource It is noted that, the above scheme of transmitting the first HARQ-ACK and the UCI simultaneously is given separately for different combinations of the UCI and the first HARQ-ACK, not all ways need to be used, and depends on the UCI type defined in the method or scheme for determining the UCI of the target time unit and a corresponding simultaneous transmission scheme is selected under the corresponding UCI type.

Further, in case that it is required to select a PUCCH resource from PUCCH resources corresponding to SPS based on a total number of bits of the HARQ-ACK corresponding to the SPS PDSCH, in case that an unavailable symbol is included in a symbol set corresponding to the selected PUCCH resource in the target time unit, the first HARQ-ACK is discarded, or the target time unit is used as the initial time unit, and a target time unit is determined again for transmitting the first HARQ-ACK.

It should be noted for "the target time unit is used as the initial time unit, and a target time unit is determined again for transmitting the first HARQ-ACK" that only the first HARQ-ACK may be deferred, or the first HARQ-ACK and other HARQ-ACKs corresponding to SPS PDSCH transmitted simultaneously with the first HARQ-ACK in the target time unit may be deferred simultaneously.

Specifically, if the PUCCH resource corresponding to the SPS PDSCH needs to be used for transmission, it is also possible to first judge whether an unavailable symbol is included in the PUCCH resource corresponding to the SPS PDSCH in the target time unit, and if the unavailable symbol is included, HARQ-ACK of the SPS PDSCH is discarded without being transmitted and if the unavailable symbol is not included, the multiplexing transmission scheme in the related art is used in the target time unit for multiplexing transmission.

For the above ways 1 to 4, in case that a PUCCH resource is selected from PUCCH resources corresponding to SPS PDSCH based on a total number of bits, if an unavailable symbol is included in the selected PUCCH resource in the target time unit, the HARQ-ACK of SPS PDSCH is discarded and not transmitted, or the HARQ-ACK of the SPS PDSCH continues to be deferred in the above-mentioned scheme, or the HARQ-ACK of the corresponding SPS PDSCH in the target time unit is deferred together with the HARQ-ACK of the SPS PDSCH based on above method.

Specifically, in case that the way 5 is adopted, the receiving the first HARQ-ACK in the target time unit includes:

in case that the UCI is defined as a HARQ-ACK, channel state information (CSI) and a scheduling request (SR), transmitting the first HARQ-ACK through the first PUCCH resource in the target time unit, or determining whether an unavailable symbol is included in a symbol set corresponding to the first PUCCH resource in the target time unit, discarding the first HARQ-ACK in case that the unavailable symbol is included, and transmitting the first HARQ-ACK through the first PUCCH resource in the target time unit in case that the unavailable symbol is not included; or in case that the UCI is defined as a HARQ-ACK corresponding to a second SPS PDSCH, channel state information (CSI) and a scheduling request (SR), in case that no HARQ-ACK transmission of the PDSCH with a corresponding PDCCH is present in the target time unit, transmitting the first HARQ-ACK through the first PUCCH resource, or determining whether an unavailable symbol is included in a symbol set corresponding to the first PUCCH resource in the target time unit, discarding the first HARQ-ACK in case that the unavailable symbol is included, and transmitting the first HARQ-ACK through the first PUCCH resource in the target time unit in case that the unavailable symbol is not included; and in case that the HARQ-ACK transmission of the PDSCH with a corresponding PDCCH is present in the target time unit, transmitting the first HARQ-ACK and the HARQ-ACK of the PDSCH with corresponding PDCCH simultaneously, and the second SPS PDSCH and the first SPS PDSCH correspond to the same SPS configuration, or correspond to different SPS configurations.

Specifically, in case that the way 6 is adopted, the receiving the first HARQ-ACK in the target time unit includes:

in case that the UCI is defined as a HARQ-ACK, channel state information (CSI) and a scheduling request (SR), and the PUCCH resource for carrying the first HARQ-ACK is the first PUCCH resource, transmitting the first HARQ-ACK through the first PUCCH resource in the target time unit; or in case that the UCI is defined as a HARQ-ACK corresponding to the second SPS PDSCH, channel state information (CSI) and a scheduling request (SR) and the PUCCH resource for carrying the first HARQ-ACK is the first PUCCH resource, in case that no HARQ-ACK transmission of the PDSCH with corresponding PDCCH is present in the target time unit, transmitting the first HARQ-ACK through the first PUCCH resource, and in case that a HARQ-ACK transmission of the PDSCH with a corresponding PDCCH is present in the target time unit, transmitting the first HARQ-ACK and the HARQ-ACK of the PDSCH with a corresponding PDCCH simultaneously, and the second SPS PDSCH and the first SPS PDSCH correspond to the same SPS configuration, or correspond to different SPS configurations.

It should be noted that, in ways 5 and 6, "HARQ-ACK" in "the UCI is defined as HARQ-ACK" includes the HARQ-ACK of the PDSCH with corresponding PDCCH and the HARQ-ACK corresponding to the second SPS PDSCH, where the second SPS PDSCH and the first SPS PDSCH correspond to the same SPS configuration, or correspond to different SPS configurations. That is, the HARQ-ACK includes any HARQ-ACK.

In ways 5 and 6, "transmitting the first HARQ-ACK and the HARQ-ACK of the PDSCH with corresponding PDCCH simultaneously" includes: determining a PUCCH resource set based on a total number of bits of the first HARQ-ACK and the HARQ-ACK of PDCCH with the corresponding PUCCH, determining a PUCCH resource from the determined PUCCH resource set based on the PUCCH resource indication field in the PDCCH, and transmitting the first HARQ-ACK and the HARQ-ACK of the PDSCH with corresponding PDCCH simultaneously on the determined PUCCH resource.

Further, if the target time unit is not within a preset deferring range, the first HARQ-ACK is discarded.

The preset deferring range may be pre-configured by signaling, or pre-defined in a protocol, and the deferring range may be a unit of time, and may be also other units, such as symbols.

Specifically, in case that the deferring is performed according to the above method, if the predefined or configured maximum deferring range is exceeded, the deferring is stopped, and the HARQ-ACK of the SPS PDSCH is discarded.

For example, the preset deferring range is a set value, for example, the preset deferring range is [0, 8], which means that 8 time units are deferred at most. That is, if the target time unit exceeds the preset deferring range, the deferring is stopped, and the first HARQ-ACK of the first SPS PDSCH is discarded.

Further, on the basis of the foregoing embodiments, determining the initial time unit includes: determining the initial time unit based on a feedback timing of the HARQ-ACK corresponding to the first SPS PDSCH.

It should be noted that the feedback timing (i.e., K1) of the HARQ-ACK may be notified by the indication field in the PDCCH that activates the SPS PDSCH, or may also be a unique value configured by the high layer signaling, that is, if one K1 value is configured by the high layer signaling, then this value is used. If K1 values are configured, a K1 value is determined from the K1 values based on an indication field in the PDCCH.

Further, based on the foregoing embodiments, the unavailable symbols include at least one of the following symbols: a downlink (DL) symbol configured by high layer signaling, a flexible (FL) symbol configured by high layer signaling, a symbol scheduled by downlink control information (DCI) for downlink transmission, a symbol indicated as DL or FL by DCI format A for indicating the time unit structure, a symbol occupied by GP, a symbol occupied by transmission of synchronization signal block (SSB), and a vacant symbol predetermined by a system.

It should be noted that the behavior scheduled by the DCI for downlink transmission includes the behavior of instructing the terminal to receive PDSCH or CSI-RS by DCI format 1_0, DCI format 1_1, or DCI format 0_1.

Regarding the unavailable symbol, the symbol in these cases including "a symbol scheduled by downlink control information (DCI) for downlink transmission, a symbol indicated as DL or FL by DCI format A for indicating the time unit structure, a symbol occupied by GP, a symbol occupied by transmission of synchronization signal block (SSB), and a vacant symbol predetermined by a system" listed above is usually the FL symbol configured by the high layer signaling, that is, the FL symbol is determined accordingly. If these conditions are satisfied, the FL symbol is considered to be an unavailable symbol; where DCI format A may be DCI format 2-0 scrambled by SFI-RNTI.

Specifically, the unavailable symbol includes at least one of the following symbols: a DL symbol or an FL symbol configured by high layer signaling, a symbol scheduled by DCI for downlink transmission, a symbol indicated as DL or FL by DCI format A, a symbol occupied by GP, a symbol occupied by transmission of SSB, and a vacant symbol predetermined by a system where DCI format A is used to carry the DCI indicating the uplink and downlink structure, such as DCI format 2-0 scrambled by SFI-RNTI; and the behavior scheduled by the DCI for downlink transmission includes the behavior of instructing the terminal to receive PDSCH or CSI-RS by DCI format 1_0, DCI format 1_1, or DCI format 0_1.

Specifically, the unavailable symbols defined in the above-mentioned different ways or schemes may be the same or different, for example, the DL symbol configured by a high layer signaling is uniformly defined as the unavailable symbols, or the DL symbol and FL symbol configured by the high layer signaling are uniformly defined as the unavailable symbol. For another example, one of the above definitions can be selected for different ways or schemes. For example, the DL symbol configured by high layer signaling is defined as the unavailable symbol for way 1, and the DL symbol and FL symbol configured by high layer signaling are defined as unavailable symbols for way 4 or way 6.

The time unit in the present embodiment includes: a slot, a sub-slot, and the like. Definitions of other time units, such as subframes, mini-slots, etc., are not excluded.

The method for processing HARQ of SPS PDSCH according to the present embodiment is applied to an asymmetric spectrum. The SPS PDSCH corresponds to a short-period SPS configuration, for example, an SPS configuration with a period less than one radio frame or X1 slot (of course, it is not excluded that the SPS PDSCH can be the SPS PDSCH under any SPS configuration).

For the method for processing HARQ of SPS PDSCH, in case that the PUCCH resource carrying the HARQ-ACK of the SPS PDSCH in the time unit determined according to the corresponding K1 of the SPS PDSCH is unavailable, the HARQ-ACK of SPS PDSCH is deferred in a target time unit for being transmitted, which may avoid discarding the HARQ-ACK of SPS PDSCH as much as possible.

Figure 4:
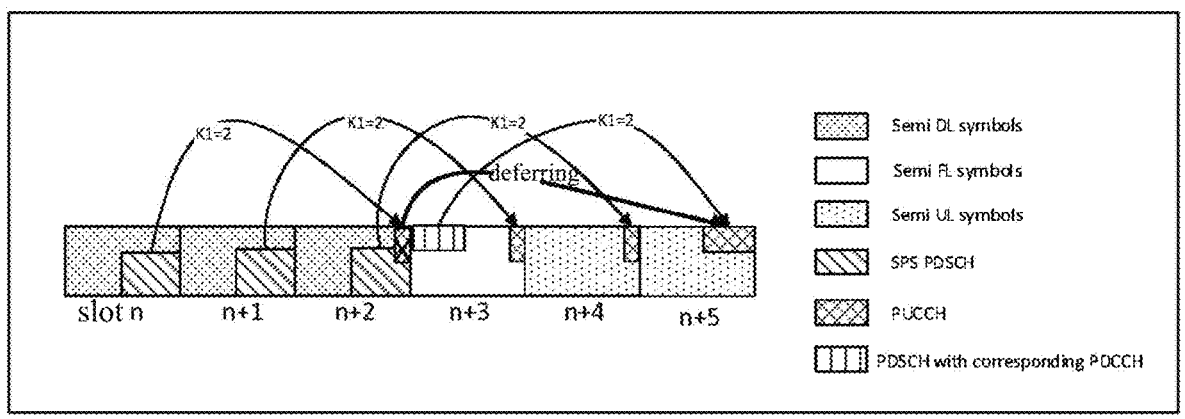
FIG. 4 is a schematic diagram of a slot in which HARQ-ACK is deferred according to another embodiment of the present application.

FIGS. 3 and 4 are schematic diagrams of a slot in which HARQ-ACK is deferred according to another embodiment of the present application. In FIGS. 3 and 4, n, n+1, n+2, n+3, and n+4 are respectively five consecutive slots, K1 is an offset value of the slot, Semi DL symbols represent half downlink symbols, Semi FL symbols represent half forward link symbols, Semi DL symbols represent half uplink symbols, PUSCH with corresponding PDCCH represents a PDCCH with corresponding PUSCH. Ways 1 to 4 in the above-mentioned embodiments will be described below with reference to FIGS. 3 and 4:

In case that the terminal is configured with an SPS configuration with a period of 1 ms, and the SPS configuration is pre-configured with 3 PUCCH resources (any one of 1 to 4 resources may be configured, here taking 3 PUCCH resources as an example). PUCCH resource 1 uses PUCCH format 0 or 1, corresponding to 1 to 2 bits transmission, its start symbol is the symbol having a number of 12, and a duration length is 2 symbols, that is, the PUCCH is located in the last two symbols in a slot. PUCCH resource 2 and 3 use one of PUCCH formats 2, 3, and 4 (the formats of PUCCH resources 2 and 3 are not necessarily the same). PUCCH resource 2 corresponds to 3 to A1 bits transmission, and its start symbol is the symbol having a number of 10 and a duration length is 4 symbols, that is, the PUCCH is located in the last 4 symbols of a slot. PUCCH resource 3 corresponds to A1+1 to 1706 bits of transmission, the start symbol is the symbol having a number of 12, and the duration length is 2 symbols, that is, this PUCCH is located in the last 2 symbols of a slot. In case that K1 indicated in the DCI for activating this SPS configuration is equal to 2, the SPS PDSCH corresponding to this SPS configuration in each slot determines its slot in which HARQ-ACK feedback is located based on K1 being is equal to 2. Specifically, the slot number n+K1 in which an SPS PDSCH is transmitted is the slot for transmitting its HARQ-ACK feedback information.

(1) The SPS PDSCH in slot n determines that HARQ-ACK feedback needs to be performed in slot n+2 based on K1. However, since slot n+2 is a full downlink slot, a symbol set (that is, the last two symbols in this slot) corresponding to the PUCCH resource for carrying HARQ-ACK of SPSP DSCH in slot n+2 contains an unavailable symbol (taking the DL symbol as an unavailable symbol as an example), the HARQ-ACK of SPS PDSCH in slot n needs to be deferred to a target slot for being transmitted, specifically:

in case that way 1 is adopted, the target slot is a slot subsequent to slot n+2, that is, slot n+3. In this case, HARQ-ACK feedback of the SPS PDSCH in slot n+1 is present in slot n+3 and then the HARQ-ACK of the SPS PDSCH in slot n and the HARQ-ACK of the SPS PDSCH in slot n+1 are multiplexed on the same PUCCH resource and transmitted in slot n+3. Specifically, since the number of bits is 2, it can be determined to use PUCCH resource 1;

if the flexible symbols configured by RRC are used as available symbols according to predetermined rules, for example, the flexible symbols configured by RRC are always used as available symbols, or the flexible symbols configured by RRC are always used as available symbols in case that no DCI format 2-0 is configured, or the flexible symbols configured by RRC are always used as available symbols in case that DCI format 2-0 is configured and DCI format 2-0 indicates the slot structure corresponding to the number 255, no unavailable symbols are included in the symbol set where PUCCH resource 1 is located in slot n+3. That is, the HARQ-ACK of the SPS PDSCH in the slot n and the HARQ-ACK of the SPS PDSCH in the slot n+1 may be transmitted through the PUCCH resource 1; as shown in FIG. 3;

if it is determined that the symbols included in PUCCH resource 1 have unavailable symbols according to predetermined rules, for example, in case that the flexible symbols configured by RRC are occupied by SSB or there is downlink transmission scheduled by DCI on the flexible symbols configured by RRC, the flexible symbols configured by RRC are unavailable symbols, or the flexible symbols configured by RRC are always unavailable symbols, or in case that DCI format 2-0 is configured and DCI format 2-0 indicates a slot structure corresponding to a number other than 255, and if DCI format 2-0 indicates that the flexible symbol is unavailable, the above-mentioned flexible symbol is included in the symbol set included in the PUCCH resource 1 and thus the HARQ-ACK feedback of the SPS PDSCH in the slot n is discarded, or the above method can be repeated and then the HARQ-ACK feedback of the SPS PDSCH in the slot n is deferred;

in addition, if HARQ-ACK feedbacks of SPS PDSCH corresponding to other SPS configurations are present in slot n+3, a total number of bits of the HARQ-ACK feedback corresponding to SPS PDSCH in slot n+3 exceeds 2 and does not exceed A1, PUCCH resource 2 needs to be used to transmit all the HARQ-ACK feedbacks of the corresponding SPS PDSCHs in slot n+3, and it is necessary to judge whether unavailable symbols are included in the symbol set of PUCCH resource 2 in slot n+3 and the judgment method is same as the method mentioned above and not repeated herein. If it is determined to exclude unavailable symbols, all the HARQ-ACK feedbacks of the corresponding SPS PDSCHs in slot n+3 are transmitted through the PUCCH resource 2 while if it is determined to include unavailable symbols, the HARQ-ACK feedback of the SPS PDSCH in slot n is discarded or the above method can be repeated and then the HARQ-ACK feedback of the SPS PDSCH in the slot n is deferred.

In case that way 2 is adopted, it is assumed that the UCI contains at least the HARQ-ACK of the SPS PDSCH. Since the most recent slot subsequent to slot n+2 containing UCI transmission (or containing UCI transmission that overlaps with PUCCH resource 1, that is, the PUCCH resource of UCI in slot n+2 and PUCCH resource 1 overlap in the time domain) is slot n+3, then slot n+3 is determined as a target slot, and the processing process in slot n+3 is the same as above and does not be repeat here. If the UCI specified in way 2 is the HARQ-ACK of PDSCH with corresponding PDCCH or CSI or SR, it is necessary to find the latest slot containing PUCCH carrying the HARQ-ACK of PDSCH with corresponding PDCCH or CSI or SR (further containing PUCCH resource of UCI overlapping with PUCCH resource 1). For example, assuming that a PUCCH carrying HARQ-ACK of PDCCH with corresponding PDCCH or CSI or SR is present in slot n+5, slot n+5 is determined as the target slot. Taking PUCCH carrying the HARQ-ACK of PDSCH with corresponding PDCCH being present in slot n+5 as an example, a PUCCH resource set corresponding to a total number of bits of the HARQ-ACK of SPS PDSCH in slot n and the HARQ-ACK of PDSCH with corresponding PDCCH is selected from PUCCH resource sets pre-configured based on a total number of bits, a PUCCH resource is selected from the selected PUCCH resource set based on the PUCCH resource indication field in the PDCCH corresponding to HARQ-ACK of PDSCH with corresponding PDCCH and then the HARQ-ACK of SPS PDSCH in slot n and the HARQ-ACK of PDSCH with corresponding PDCCH are transmitted simultaneously on the selected PUCCH resource as shown in FIG. 4.

In case that way 3 is adopted, the slot immediately subsequent to slot n+2 in which the HARQ-ACK of the SPS PDSCH is transmitted is slot n+3, slot n+3 is determined as the target slot and the processing process is the same as above, and will not be repeated here.

In case that way 4 is adopted, assuming that the PUCCH resource defined in way 4 is a PUCCH resource that is multiplexed and transmitted according to the first HARQ-ACK and other UCIs (that is, the PUCCH resource determined based on the simultaneous transmission rule) in case that whether the PUCCH is determined to be available. In case that the target slot is determined, slots need to be tried one by one. For example, in case that transmission of HARQ-ACK of SPS PDSCH in slot n+1 is present in slot n+3 subsequent to slot n+2, if the HARQ-ACK of the PDSCH in slot n is deferred to this slot and needs to be multiplexed and transmitted with the HARQ-ACK of the SPS PDSCH in the corresponding slot n+1; one of the PUCCH resources 1, 2, and 3 is selected based on a total number of bits of HARQ-ACK corresponding to the SPS PDSCH. Assuming that no HARQ-ACK of other SPS PDSCH configured by the SPS needs to be transmitted in the slot n+3, it is determined to use PUCCH resource 1 for transmission based on a number of bits of HARQ-ACK of a corresponding SPS PDSCH according to 2 bits, and then it is necessary to judge whether the PUCCH resource 1 contains unavailable symbols in slot n+3 in a similar way to way 1. If the PUCCH resource 1 contains unavailable symbols in slot n+3, slot n+3 cannot be used as the target slot and above process needs to be repeated to continues to search for the next slot. If the PUCCH resource 1 contains no unavailable symbols in slot n+3, then slot n+3 is used as the target slot, and the processing process in slot n+3 is the same as above, and will not be repeated here.

In case that way 4 is adopted, assuming that the PUCCH resource defined in way 4 is a first PUCCH resource (that is, the PUCCH resource used in case that the HARQ-ACK of the SPS PDSCH in the slot n is independently transmitted, i.e., the PUCCH resource 1 in the present embodiment) in case that whether the PUCCH is determined to be available. In case that the target slot is determined, it is only necessary to search for the slot subsequent to slot n+2 satisfying the requirement that PUCCH resource 1 contains no unavailable symbols. For example, in case that only DL symbol configured by high layer signaling is assumed to be an unavailable symbol, it can be found that slot n+3 is a first slot satisfying the condition (because the PUCCH resource 1 in slot n+3 occupies the last 2 symbols, which are FL symbols, not unavailable symbols) and thus slot n+3 is determined as the target slot, and the processing process in slot n+3 is the same as above, and will not be repeated here. in case that only a DL symbol and an FL symbol configured by high layer signaling is assumed to be unavailable symbols, slot n+4 is a first slot satisfying the condition and thus slot n+4 is determined as the target slot. Since transmission of HARQ-ACK of SPS PDSCH in slot n+1 is still present in slot n+4, the resource for transmission of HARQ-ACK is also PUCCH resource 1 and thus HARQ-ACK corresponding to SPS PDSCH in slot n and slot n+1 needs to be transmitted on the same PUCCH resource. It is determined to use the PUCCH resource 1 of the PUCCH resources corresponding to the SPS configuration based on a total number of bits (not more than 2) of the HARQ-ACK of the two SPS PDSCHs and the HARQ-ACK of the two SPS PDSCHs can be simultaneously transmitted on the PUCCH resource 1. Particularly, if HARQ-ACK of other SPS PDSCH is present in n+4 and also needs to be transmitted in the last two symbols, the PUCCH resource determined based on a total number of bits of HARQ-ACK corresponding to the SPS PDSCH may be PUCCH resource 2 or 3, and whether the PUCCH resource 2 or 3 contains an unavailable symbol needs to be further determined. If the PUCCH resource 2 or 3 contains an unavailable symbol, the HARQ-ACK feedback of the SPS PDSCH in the slot n may be discarded, or the above method may continue to be repeated and the HARQ-ACK feedback of the SPS PDSCH in the slot n is deferred backwards.

In the above process, it can be agreed that the maximum number of deferring slot is defined as 5, that is, a target slot that satisfies the condition have not been found in more than 5 slots subsequent to slot n+2, the HARQ-ACK feedback of SPS PDSCH in slot n will be discarded.

(2) SPS PDSCH in slot n+1, it can be determined to perform HARQ-ACK feedback in slot n+3 based on K1.

Based on the rules similar to the above whether flexible is available, if it is determined that the flexible symbols in the symbol set corresponding to PUCCH resource 1 in slot n+3 are all available, the HARQ-ACK of SPS PDSCH in corresponding slot n+1 can be transmitted directly through PUCCH resource 1 in slot n+3. If it is determined that the flexible symbols in the symbol set corresponding to PUCCH resource 1 in slot n+3 are all unavailable, the HARQ-ACK of SPS PDSCH in corresponding slot n+1 may be deferred to the target slot n+4 using above ways 1 to 4.

(3) SPS PDSCH in slot n+3, it can be determined to perform HARQ-ACK feedback in slot n+4 based on K1. Since symbol sets corresponding to PUCCH resource 1 are uplink in slot n+4, it excludes unavailable symbols, the HARQ-ACK of the SPS PDSCH in the corresponding slot n+3 can be transmitted directly in the slot n+4 through the PUCCH resource 1.

Figure 5:
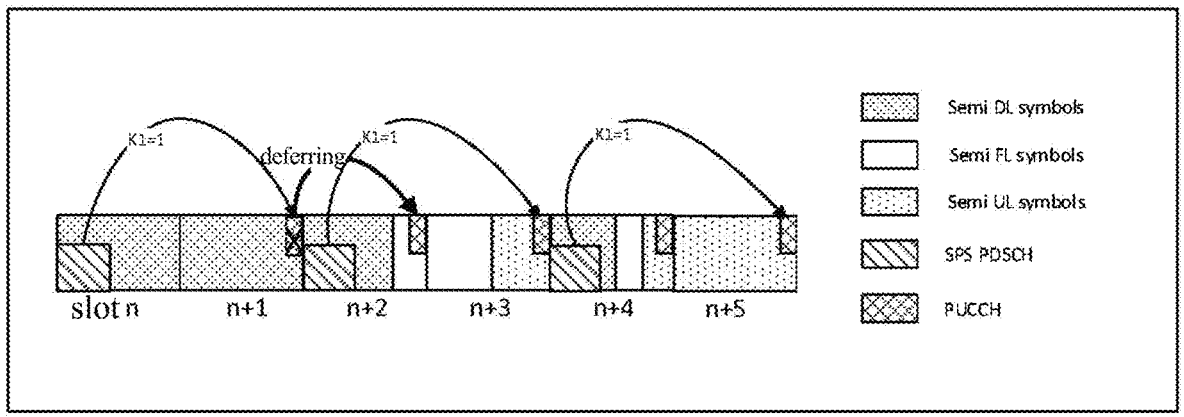
FIG. 5 is a schematic diagram of a slot in which HARQ-ACK is deferred according to another embodiment of the present application.
Figure 6:
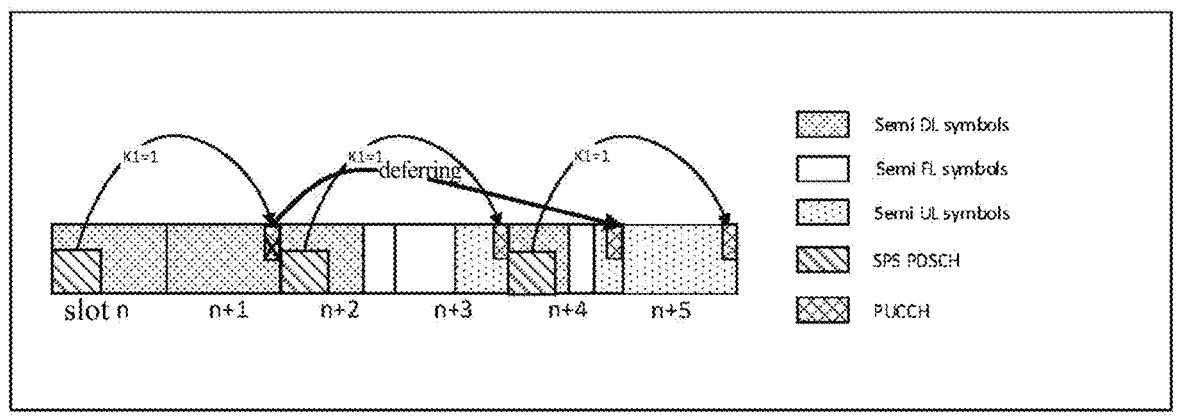
FIG. 6 is a schematic diagram of a slot in which HARQ-ACK is deferred according to another embodiment of the present application.

FIGS. 5 and 6 are schematic diagrams of another slots in which HARQ-ACK is deferred according to another embodiment of the present application. In FIGS. 5 and 6, n, n+1, n+2, n+3, n+4 and n+5 are respectively six consecutive slots, K1 is an offset value of the slot, Semi DL symbols represent half downlink symbols, Semi FL symbols represent half forward link symbols, Semi DL symbols represent half uplink symbols, PUSCH with corresponding PDCCH represents a PDCCH with corresponding PUSCH. Ways 5 and 6 are described below with reference to FIGS. 5 and 6:

In case that the terminal is configured with an SPS configuration with a period of 1 ms, and the SPS configuration is pre-configured with 3 PUCCH resources (any one of 2 to 4 resources may be configured, here taking 3 PUCCH resources as an example). PUCCH resource 1 uses PUCCH format 0 or 1, corresponding to 1 to 2 bits transmission, its start symbol is the symbol having a number of 12, and a duration length is 2 symbols, that is, the PUCCH is located in the last two symbols in a slot. PUCCH resource 2 and 3 use one of PUCCH formats 2, 3, and 4 (the formats of PUCCH resources 2 and 3 are not necessarily the same). PUCCH resource 2 corresponds to 3 to A1 bits transmission, and its start symbol is the symbol having a number of 10 and a duration length is 4 symbols, that is, the PUCCH is located in the last 4 symbols of a slot. PUCCH resource 3 corresponds to A1+1 to 1706 bits of transmission, the start symbol is the symbol having a number of 12, and the duration length is 2 symbols, that is, this PUCCH is located in the last 2 symbols of a slot. In case that K1 indicated in the DCI for activating this SPS configuration is equal to 1, the SPS PDSCH corresponding to this SPS configuration in slots n, n+2 and n+4 determines its slot in which HARQ-ACK feedback is located based on K1 being is equal to 2. Specifically, the slot number n+K1 in which an SPS PDSCH is transmitted is the slot for transmitting its HARQ-ACK feedback information and for the SPS PDSCH in slot n, its HARQ-ACK is transmitted separately through PUCCH resource 1 (that is, PUCCH resource 1 is the first PUCCH resource), In case that way 5 is adopted, it is assumed that the defined UCI is a semi-static UCI, such as CSI, SR, and HARQ-ACK corresponding to SPS PDSCH. Since a symbol contained in PUCCH resource 1 determined based on K1=1 in slot n+1 is DL, assuming that DL is an unavailable symbol, the PUCCH resource 1 in slot n+1 contains an unavailable symbol, and the HARQ-ACK needs to be deferred to a first slot not including the above UCI or the above-mentioned UCI overlapping with PUCCH resource 1. Since slot n+2 excludes the above-mentioned UCI transmission or excludes the above-mentioned UCI transmission overlapping with PUCCH resource 1, then slot n+2 is determined as the target slot, as shown in FIG. 5 In n+2: if a HARQ-ACK of a PDSCH with corresponding PDCCH (referred to as dynamic HARQ-ACK) overlaps with PUCCH resource 1, the HARQ-ACK of the SPS PDSCH in slot n is multiplexed with the dynamic HARQ-ACK and transmitted. Specifically, a PUCCH resource set is determined based on a total number of bits of HARQ-ACK of the SPS PDSCH and dynamic HARQ-ACK in slot n, a PUCCH resource is selected in the determined PUCCH resource set based on PUCCH resource indication field in the PDCCH, the HARQ-ACK of the SPS PDSCH in slot n and dynamic HARQ-ACK are transmitted on the determined PUCCH resource. If there is no dynamic HARQ-ACK or there is no dynamic HARQ-ACK transmission overlapping with PUCCH resource 1, the HARQ-ACK of the SPS PDSCH in slot n is transmitted through PUCCH resource 1. Specifically, it can be further determined based on predetermined rules whether the FL symbol occupied by PUCCH resource 1 is available (for example, a downlink transmission scheduled by DCI, SSB, DL or FL indicated by DCI format 2-0 are present in at least one of the two symbols). If the FL symbol occupied by PUCCH resource 1 is unavailable, the HARQ-ACK feedback of the SPS PDSCH in slot n is discarded or the above method may continue to be repeated and the HARQ-ACK feedback of the SPS PDSCH in the slot n is deferred backwards.

In case that way 6 is adopted, it is assumed that the defined UCI is a semi-static UCI, such as CSI, SR, and HARQ-ACK corresponding to SPS PDSCH. Since a symbol contained in PUCCH resource 1 determined based on K1=1 in slot n+1 is DL, assuming that DL is at least an unavailable symbol, the PUCCH resource 1 in slot n+1 contains an unavailable symbol, and the HARQ-ACK needs to be deferred. In subsequent slot n+2: PUCCH resource 1 (the last two symbols in one slot) occupy the last 2 FL symbols, if it is assumed that the FL symbols are not unavailable symbols (for example, only DL is an unavailable symbol), since PUCCH resource 1 in slot n+2 excludes unavailable symbols, and no above-mentioned UCI transmission (or the above-mentioned UCI transmission overlapping with PUCCH resource 1) is present, slot n+2 may be determined to be the target slot, and in slot n+2, the HARQ-ACK of SPS PDSCH in slot n is transmitted through PUCCH resource 1, as shown in FIG. 5. If it is assumed that the FL symbol is also an unavailable symbol, although no UCI (or the above-mentioned UCI transmission overlapping with PUCCH resource 1) is present in slot n+2, PUCCH resource 1 cannot be used as the target slot due to containing unavailable symbol, searching continues backwards. In slot n+3: although the PUCCH resource 1 does not contain the unavailable symbol, HARQ-ACK transmission of other SPS PDSCHs is present (or HARQ-ACK transmission of other SPS PDSCHs is present and the resource overlaps with PUCCH resource 1), that is, the above UCI (or the above UCI transmission overlapping with PUCCH resource 1) is present, slot n+3 cannot be used as the target slot. In slot n+4: since PUCCH resource 1 has no unavailable symbols and no UCI (or no UCI overlapping with PUCCH resource 1) is present, slot n+4 satisfies the condition and may be used as the target time unit. As shown in FIG. 6, in slot n+4: if a HARQ-ACK (dynamic HARQ-ACK) of PDSCH with corresponding PDCCH overlaps with PUCCH resource 1, the HARQ-ACK of SPS PDSCH in slot n and the dynamic HARQ-ACK are multiplexed and transmitted. Alternatively, a PUCCH resource set is determined based on a total number of bits of the HARQ-ACK of the SPS PDSCH in the slot n and dynamic HARQ-ACK, a PUCCH resource is selected from the determined PUCCH resource set based on the PUCCH resource indication field in the PDCCH and the HARQ-ACK of the SPS PDSCH in slot n and dynamic HARQ-ACK are transmitted on the determined PUCCH resource. If no dynamic HARQ-ACK or no transmission of dynamic HARQ-ACK overlapping with PUCCH resource 1 is present, the HARQ-ACK of the SPS PDSCH in slot n is transmitted through PUCCH resource 1. In this case, it is not necessary to perform the judgment of whether PUCCH resource 1 in way 5 is available, since the validity of PUCCH resource 1 has been considered in case that the target slot is determined.

It should be noted that the above embodiment only takes a specific situation as an example. After changing the relevant parameters, the method is also applicable. For example, the slot is changed to a sub-slot, SPS transmission period is changed and an agreement rule defining which symbols as unavailable symbols is changed and so on.

Figure 7:
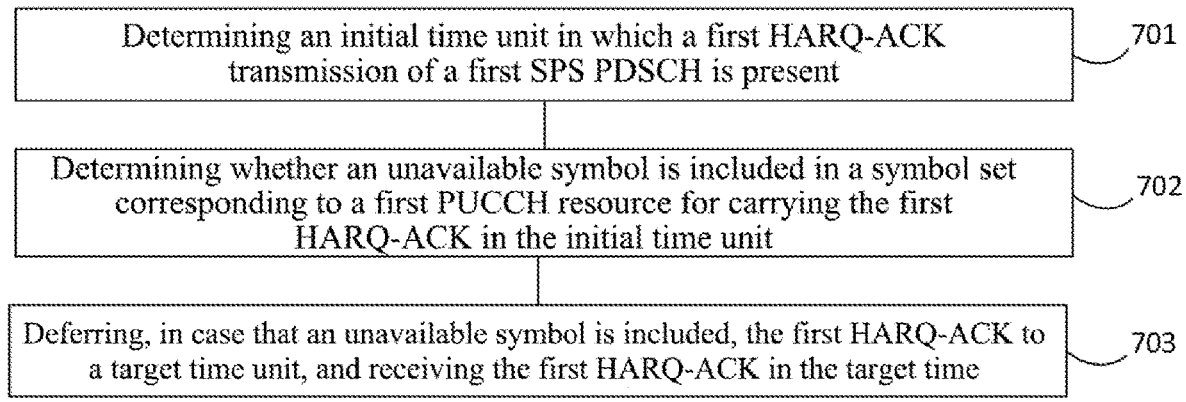
FIG. 7 is a schematic flowchart of a method for processing HARQ of SPS PDSCH on a base station side according to another embodiment of the present application.

FIG. 7 is a schematic flowchart of a method for processing HARQ of SPS PDSCH on a base station side according to another embodiment of the present application. As shown in FIG. 7, the method includes:

step 701, determining an initial time unit in which a first HARQ-ACK transmission of a first SPS PDSCH is present;

step 702, determining whether an unavailable symbol is included in a symbol set corresponding to a first PUCCH resource for carrying the first HARQ-ACK in the initial time unit; and step 703, deferring, in case that an unavailable symbol is included, the first HARQ-ACK to a target time unit, and receiving the first HARQ-ACK in the target time.

In the method for processing HARQ of SPS PDSCH, the base station side performs the above steps 701-703 to receive the first HARQ-ACK transmitted by the terminal.

In case that the terminal side determines to discard the first HARQ-ACK, correspondingly, the base station side will not receive the content, so it can directly determine that the first HARQ-ACK is discarded without performing the receiving process, to directly retransmit the first SPS PDSCH.

For the method for processing HARQ of SPS PDSCH, in case that the PUCCH resource carrying the HARQ-ACK of the SPS PDSCH in the time unit determined according to the corresponding K1 of the SPS PDSCH is unavailable, the HARQ-ACK of SPS PDSCH is deferred in a target time unit for being transmitted, which may avoid discarding the HARQ-ACK of SPS PDSCH as much as possible.

In an embodiment, the method further includes determining the target time unit based on one of the following ways:

way 1: taking a time unit immediately subsequent to the initial time unit as the target time unit;

way 2: taking an earliest time unit in which a UCI transmission occurs subsequent to the initial time unit as the target time unit; or, taking an earliest time unit in which a UCI transmission overlapping with the first PUCCH resource occurs subsequent to the initial time unit as the target time unit;

way 3: taking an earliest time unit in which a second HARQ-ACK corresponding to a second SPS PDSCH is transmitted subsequent to the initial time unit as the target time unit, and the second SPS PDSCH and the first SPS PDSCH correspond to a same SPS configuration, or correspond to different SPS configurations;

way 4: taking an earliest time unit subsequent to the initial time unit, which satisfies that an unavailable symbol is not included in a PUCCH resource for carrying the first HARQ-ACK, as the target time unit;

way 5: taking an earliest time unit in which no UCI transmission is present subsequent to the initial time unit as the target time unit; or, taking an earliest time unit in which no UCI transmission overlapping with the first PUCCH resource is present subsequent to the initial time unit as the target time unit; and way 6: taking an earliest time unit subsequent to the initial time unit, which satisfies that a UCI transmission is absent and an unavailable symbol is not included in a PUCCH resource for carrying the first HARQ-ACK, as the target time unit; or, taking an earliest time unit subsequent to the initial time unit, which satisfies that no UCI transmission overlapping with the first PUCCH resource is present and an unavailable symbol is not included in the PUCCH resource for carrying the first HARQ-ACK, as the target time unit.

In an embodiment, in case that the way 1 is adopted, the receiving the first HARQ-ACK in the target time unit includes:

in case that the UCI transmission or the UCI transmission overlapping with the first PUCCH resource is present in the target time unit, receiving the first HARQ-ACK and the UCI in the target time unit simultaneously;

in case that the UCI transmission or the UCI transmission overlapping with the first PUCCH resource is absent in the target time unit, adopting one of the following schemes:

scheme 1: determining that the first HARQ-ACK is discarded;

scheme 2: receiving the first HARQ-ACK through the first PUCCH resource in the target time unit; and scheme 3: determining whether an unavailable symbol is included in a symbol set corresponding to a first PUCCH resource in the target time unit; and determining that the first HARQ-ACK is discarded; in case that the unavailable symbol is included and receiving the first HARQ-ACK through the first PUCCH resource in the target time unit in case that the unavailable symbol is not included.

In an embodiment, in case that the way 2 is adopted, the receiving the first HARQ-ACK in the target time unit includes:

receiving the first HARQ-ACK and the UCI simultaneously in the target time unit.

In an embodiment, in case that the way 3 is adopted, the receiving the first HARQ-ACK in the target time unit includes:

selecting, based on a total number of bits of the first HARQ-ACK and the second HARQ-ACK, a PUCCH resource from PUCCH resources corresponding to SPS PDSCH, and receiving the first HARQ-ACK and the second HARQ-ACK simultaneously on the selected PUCCH resource.

It should be noted that, in case that the base station determines that the first HARQ-ACK is discarded, the base station may not receive the first HARQ-ACK, and it is directly considered that the terminal discards the first HARQ-ACK and does not transmit it and the first SPS PDSCH scheduling is retransmitted in the case of NACK based on the feedback information.

In an embodiment, in case that the way 4 is adopted, the processing the first HARQ-ACK in the target time unit includes one of the following:

scheme A: in case that the PUCCH resource for carrying the first HARQ-ACK is the first PUCCH resource, the receiving the first HARQ-ACK in the target time unit includes:

receiving the first HARQ-ACK through the PUCCH resource in the target time unit; and scheme B: in case that the PUCCH resource for carrying the first HARQ-ACK is a PUCCH resource that is determined from PUCCH resources corresponding to SPS PDSCH based on a total number of bits of the first HARQ-ACK and the second HARQ-ACK corresponding to the second SPS PDSCH, the receiving the first HARQ-ACK in the target time unit includes:

receiving the first HARQ-ACK and the second HARQ-ACK on the PUCCH resource simultaneously; and the second SPS PDSCH and the first SPS PDSCH correspond to the same SPS configuration, or correspond to different SPS configurations;

scheme C: in case that the PUCCH resource for carrying the first HARQ-ACK is a PUCCH resource for transmitting the UCI, the receiving the first HARQ-ACK in the target time unit includes: simultaneously receiving the first HARQ-ACK and the UCI on the PUCCH resource.

In an embodiment, the UCI includes at least one of the following information: HARQ-ACK of PDSCH with corresponding PDCCH, HARQ-ACK of corresponding second SPS PDSCH, channel state information (CSI), and scheduling request (SR), and the second SPS PDSCH and the first SPS PDSCH correspond to the same SPS configuration, or correspond to different SPS configurations.

In an embodiment, the receiving the first HARQ-ACK and the UCI simultaneously includes at least one of the following schemes:

in case that the UCI includes HARQ-ACK of the PDSCH with the corresponding physical downlink control channel (PDCCH), determining a PUCCH resource set based on a total number of bits of the first HARQ-ACK and the UCI, determining a PUCCH resource from the determined PUCCH resource set based on a PUCCH resource indication field in the PDCCH and receiving the first HARQ-ACK and the UCI through the determined PUCCH resource simultaneously;

in case that the UCI includes only CSI, receiving the first HARQ-ACK and the CSI simultaneously on a PUCCH resource corresponding to the CSI, or determining a PUCCH resource from PUCCH resources corresponding to SPS PDSCH based on a total number of bits of the first HARQ-ACK and the CSI, and receiving the first HARQ-ACK and the CSI through the determined PUCCH resource simultaneously;

in case that the UCI includes only CSI and SR, receiving the first HARQ-ACK, the CSI and the SR simultaneously on a PUCCH resource corresponding to the CSI, or determining a PUCCH resource from PUCCH resources corresponding to SPS PDSCH based on a total number of bits of the first HARQ-ACK, the CSI and the SR, and receiving the first HARQ-ACK, the CSI and the SR through the determined PUCCH resource simultaneously;

in case that the UCI includes only SR, receiving the first HARQ-ACK based on transmission schemes corresponding to different combinations of PUCCH formats used by SR and the first HARQ-ACK, or determining a PUCCH resource from PUCCH resources corresponding to SPS PDSCH based on a total number of bits of the first HARQ-ACK and the SR, and receiving the first HARQ-ACK and the SR through the determined PUCCH resource simultaneously; and in case that the UCI only includes the second HARQ-ACK corresponding to the second SPS PDSCH, determining a PUCCH resource from PUCCH resources corresponding to SPS PDSCH based on a total number of bits of the first HARQ-ACK and the second HARQ-ACK and receiving the first HARQ-ACK and the second HARQ-ACK through the determined PUCCH resource simultaneously.

In an embodiment, the receiving the first HARQ-ACK based on transmission schemes corresponding to SR and different combinations of PUCCH formats used by the first HARQ-ACK includes:

in case that the PUCCH formats used by both the SR and the first HARQ-ACK is the first format, determining that the SR is positive in case that the first HARQ-ACK is received through the SR resource and determining that the SR is negative in case that the first HARQ-ACK is received through the PUCCH resource corresponding to the first SPS PDSCH;

in case that the PUCCH format used by the first HARQ-ACK is a second format, receiving the first HARQ-ACK through the PUCCH resource corresponding to the first SPS PDSCH, and whether SR is positive or negative is determined based on the cyclic shift used in receiving the first HARQ-ACK;

in case that the PUCCH format used by the first HARQ-ACK is the first format and the PUCCH format used by the SR is the second format, determining that the SR is discarded and receiving the first HARQ-ACK through the PUCCH resource corresponding to the first SPS PDSCH; and the first format is PUCCH format 1, and the second format is PUCCH format 0.

It should be noted that, in the method according to the present embodiment, in the above step "if the PUCCH formats used by both the SR and the first HARQ-ACK are the first format, determining the SR to be positive in case that the first HARQ-ACK is received through the SR resource and determining the SR to be negative in case that the first HARQ-ACK is received through the PUCCH resource corresponding to the first SPS PDSCH" indicates that the base station needs to blindly check according to two situations since the base station does not know whether the state of the SR on the terminal side is positive or negative.

In an embodiment, in case that it is required to select a PUCCH resource from PUCCH resources corresponding to SPS based on a total number of bits of the HARQ-ACK corresponding to the SPS PDSCH, in case that an unavailable symbol is included in a symbol set corresponding to the selected PUCCH resource in the target time unit, it is determined that the first HARQ-ACK is discarded, or the target time unit is used as the initial time unit, and a target time unit is determined again for receiving the first HARQ-ACK.

In an embodiment, in case that the way 5 is adopted, the receiving the first HARQ-ACK in the target time unit includes:

in case that the UCI is defined as a HARQ-ACK, channel state information (CSI) and a scheduling request (SR), receiving the first HARQ-ACK through the first PUCCH resource in the target time unit, or determining whether an unavailable symbol is included in a symbol set corresponding to the first PUCCH resource in the target time unit and then determining that the first HARQ-ACK is discarded in case that the unavailable symbol is included, and receiving the first HARQ-ACK through the first PUCCH resource in the target time unit in case that the unavailable symbol is not included; or in case that the UCI is defined as a HARQ-ACK corresponding to a second SPS PDSCH, channel state information (CSI) and a scheduling request (SR), in case that no HARQ-ACK transmission of the PDSCH with a corresponding PDCCH is present in the target time unit, receiving the first HARQ-ACK through the first PUCCH resource, or determining whether an unavailable symbol is included in a symbol set corresponding to the first PUCCH resource in the target time unit, and determining that the first HARQ-ACK is discarded in case that the unavailable symbol is included, and receiving the first HARQ-ACK through the first PUCCH resource in the target time unit in case that the unavailable symbol is not included; and in case that the HARQ-ACK transmission of the PDSCH with the corresponding PDCCH is present in the target time unit, receiving the first HARQ-ACK and the HARQ-ACK of the PDSCH with corresponding PDCCH simultaneously, and the second SPS PDSCH and the first SPS PDSCH correspond to the same SPS configuration, or correspond to different SPS configurations.

In an embodiment, in case that the way 6 is adopted, the receiving the first HARQ-ACK in the target time unit includes:

in case that the UCI is defined as a HARQ-ACK, channel state information (CSI) and a scheduling request (SR), and the PUCCH resource being the first PUCCH resource, receiving the first HARQ-ACK through the first PUCCH resource in the target time unit; or in case that the UCI is defined as a HARQ-ACK corresponding to the second SPS PDSCH, channel state information (CSI) and a scheduling request (SR), the PUCCH resource being the first PUCCH resource, in case that no HARQ-ACK transmission of the PDSCH with corresponding PDCCH is present in the target time unit, receiving the first HARQ-ACK through the first PUCCH resource, and in case that a HARQ-ACK transmission of the PDSCH with corresponding PDCCH is present in the target time unit, receiving the first HARQ-ACK and the HARQ-ACK of the PDSCH with a corresponding PDCCH simultaneously, and the second SPS PDSCH and the first SPS PDSCH correspond to the same SPS configuration, or correspond to different SPS configurations.

In an embodiment, if the target time unit is not within a preset deferring range, it is determined that the first HARQ-ACK is discarded.

In an embodiment, determining the initial time unit includes: determining the initial time unit based on a feedback timing of the HARQ-ACK corresponding to the first SPS PDSCH.

In an embodiment, the unavailable symbols include at least one of the following symbols: a downlink (DL) symbol configured by high layer signaling, a flexible (FL) symbol configured by high layer signaling, a symbol scheduled by downlink control information (DCI) for downlink transmission, a symbol indicated as DL or FL by DCI format A for indicating the time unit structure, a symbol occupied by GP, a symbol occupied by transmission of synchronization signal block (SSB), and a vacant symbol predetermined by a system.

Figure 8:
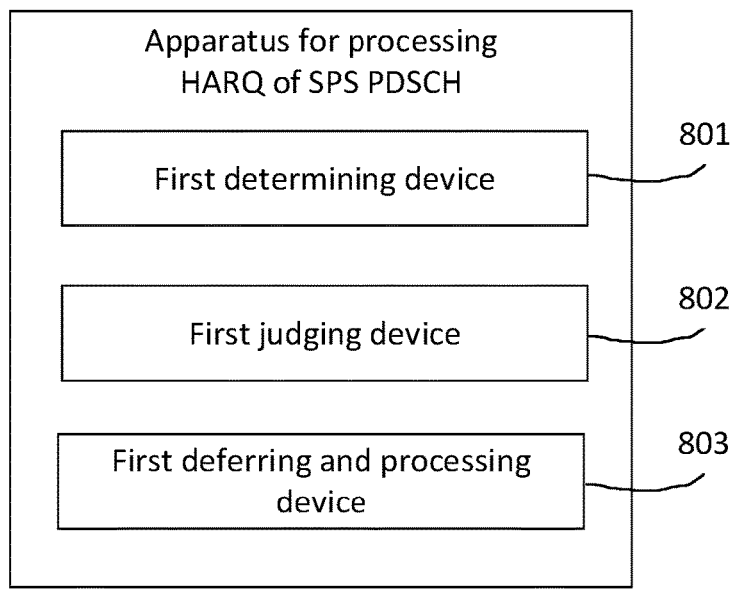
FIG. 8 is a schematic flowchart of an apparatus for processing HARQ of SPS PDSCH on a terminal side according to another embodiment of the present application.

FIG. 8 is a schematic flowchart of an apparatus for processing HARQ of SPS PDSCH on a terminal side according to the present application. Referring to FIG. 8, the apparatus includes a first determining device 801, a first judging device 802, and a first deferring and processing device 803, in which:
- a first determining device 801 configured to determine an initial time unit in which a first hybrid automatic repeat request-acknowledge character (HARQ-ACK) transmission of a first semi-persistent scheduling (SPS) physical downlink shared channel (PDSCH) is present;
- a first judging device 802 configured to determine whether an unavailable symbol is included in a symbol set corresponding to a first physical uplink control channel (PUCCH) resource for carrying the first HARQ-ACK in the initial time unit; and
- a first deferring and processing device 803, configured to defer, in case that an unavailable symbol is included, the first HARQ-ACK to a target time unit and process the first HARQ-ACK.

The apparatus for processing the HARQ of the SPS PDSCH according to the present embodiment is applicable to the method for processing the HARQ of the SPS PDSCH on the terminal side according to the foregoing embodiment, and details are not described here again.

Figure 9:
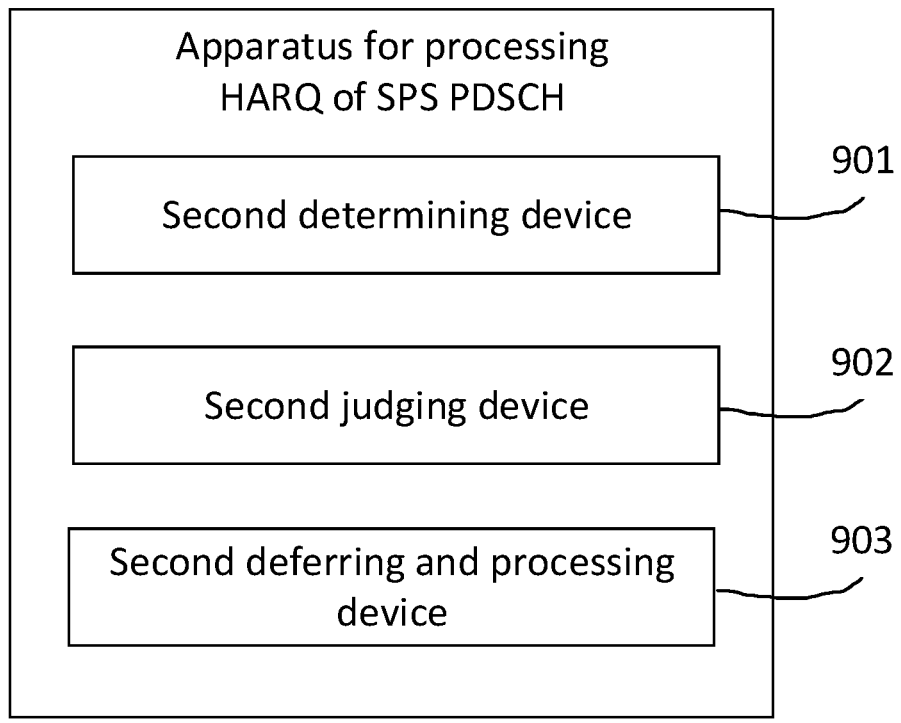
FIG. 9 is a schematic flowchart of an apparatus for processing HARQ of SPS PDSCH on a base station side according to another embodiment of the present application.

FIG. 9 is a schematic flowchart of an apparatus for processing HARQ of SPS PDSCH on a base station side according to the present application. Referring to FIG. 9, the apparatus includes a second determining device 901, a second judging device 902, and a second deferring and processing device 903, in which:
- a second determining device 901 configured to determine an initial time unit in which a first HARQ-ACK transmission of a first SPS PDSCH is present;
- a second judging device 902 configured to determine whether an unavailable symbol is included in a symbol set corresponding to a first PUCCH resource for carrying the first HARQ-ACK in the initial time unit; and
- a second deferring and processing device 903, configured to defer, in case that an unavailable symbol is included, the first HARQ-ACK to a target time unit and receive the first HARQ-ACK.

The apparatus for processing the HARQ of the SPS PDSCH according to the present embodiment is applicable to the method for processing the HARQ of the SPS PDSCH on the base station side according to the foregoing embodiment, and details are not described here again.

Figure 10:
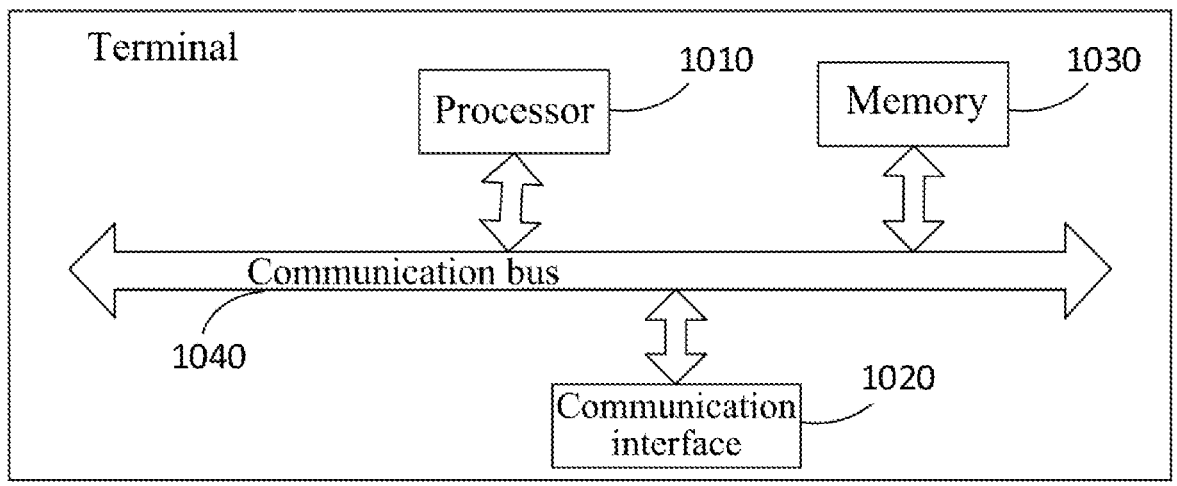
FIG. 10 is a schematic structural diagram showing a terminal according to an embodiment of the present application.

In addition, referring to FIG. 10 showing a schematic structural diagram of a terminal according to the present application. The terminal may include a processor 1010, a communication interface 1020, a memory 1030, and a communication bus 1040. The processor 1010, the communication interface 1020, and the memory 1030 communicate with each other through the communication bus 1040. The processor 1010 may invoke a computer program stored on the memory 1030 and executable on the processor 1010 to perform the following steps:
- determining an initial time unit in which a first hybrid automatic repeat request-acknowledge character (HARQ-ACK) transmission of a first SPS PDSCH is present;
- determining whether an unavailable symbol is included in a symbol set corresponding to a first physical uplink control channel (PUCCH) resource for carrying the first HARQ-ACK in the initial time unit; and
- deferring, in case that an unavailable symbol is included, the first HARQ-ACK to a target time unit and receiving the first HARQ-ACK in the target time.

In an embodiment, the method further includes determining the target time unit based on one of the following ways:
- way 1: taking a time unit immediately subsequent to the initial time unit as the target time unit;
- way 2: taking an earliest time unit in which a UCI transmission occurs subsequent to the initial time unit as the target time unit; or, taking an earliest time unit in which a UCI transmission overlapping with the first PUCCH resource occurs subsequent to the initial time unit as the target time unit;
- way 3: taking an earliest time unit in which a second HARQ-ACK corresponding to a second SPS PDSCH is transmitted subsequent to the initial time unit as the target time unit, and the second SPS PDSCH and the first SPS PDSCH correspond to a same SPS configuration, or correspond to different SPS configurations;
- way 4: taking an earliest time unit subsequent to the initial time unit, which satisfies that an unavailable symbol is not included in a PUCCH resource for carrying the first HARQ-ACK, as the target time unit;
- way 5: taking an earliest time unit in which no UCI transmission is present subsequent to the initial time unit as the target time unit; or, taking an earliest time unit in which no UCI transmission overlapping with the first PUCCH resource is present subsequent to the initial time unit as the target time unit; and
- way 6: taking an earliest time unit subsequent to the initial time unit, which satisfies that a UCI transmission is absent and an unavailable symbol is not included in a PUCCH resource for carrying the first HARQ-ACK, as the target time unit; or, taking an earliest time unit subsequent to the initial time unit, which satisfies that no UCI transmission overlapping with the first PUCCH resource is present and an unavailable symbol is not included in the PUCCH resource for carrying the first HARQ-ACK, as the target time unit.

In an embodiment, in case that the way 1 is adopted, the receiving the first HARQ-ACK in the target time unit includes:
- in case that the UCI transmission or the UCI transmission overlapping with the first PUCCH resource is present in the target time unit, transmitting the first HARQ-ACK and the UCI in the target time unit simultaneously;
- in case that the UCI transmission or the UCI transmission overlapping with the first PUCCH resource is absent in the target time unit, adopting one of the following schemes:
  - scheme 1: discarding the first HARQ-ACK;
  - scheme 2: transmitting the first HARQ-ACK through the first PUCCH resource in the target time unit; and
  - scheme 3: determining whether an unavailable symbol is included in a symbol set corresponding to the first PUCCH resource in the target time unit; and discarding the first HARQ-ACK in case that the unavailable symbol is included and transmitting the first HARQ-ACK through the first PUCCH resource in the target time unit in case that the unavailable symbol is not included.

In an embodiment, in case that the way 2 is adopted, the receiving the first HARQ-ACK in the target time unit includes:

transmitting the first HARQ-ACK and the UCI simultaneously in the target time unit.

In an embodiment, in case that the way 3 is adopted, the receiving the first HARQ-ACK in the target time unit includes:

selecting, based on a total number of bits of the first HARQ-ACK and the second HARQ-ACK, a PUCCH resource from PUCCH resources corresponding to SPS PDSCH, and transmitting the first HARQ-ACK and the second HARQ-ACK simultaneously on the selected PUCCH resource.

In an embodiment, in case that the way 4 is adopted, the processing the first HARQ-ACK in the target time unit includes one of the following:

scheme A: in case that the PUCCH resource for carrying the first HARQ-ACK is the first PUCCH resource, the processing the first HARQ-ACK in the target time unit includes:

transmitting the first HARQ-ACK through the PUCCH resource in the target time unit; and scheme B: in case that the PUCCH resource for carrying the first HARQ-ACK is a PUCCH resource that is determined from PUCCH resources corresponding to the SPS PDSCH based on a total number of bits of the first HARQ-ACK and the second HARQ-ACK corresponding to the second SPS PDSCH, the processing the first HARQ-ACK in the target time unit includes:

transmitting the first HARQ-ACK and the second HARQ-ACK on the PUCCH resource simultaneously, and the second SPS PDSCH and the first SPS PDSCH correspond to the same SPS configuration, or correspond to different SPS configurations;

scheme C: in case that the PUCCH resource for carrying the first HARQ-ACK is a PUCCH resource for transmitting the UCI, the processing the first HARQ-ACK in the target time unit includes: simultaneously transmitting the first HARQ-ACK and the UCI on the PUCCH resource.

In an embodiment, the UCI includes at least one of the following information: HARQ-ACK of PDSCH with corresponding PDCCH, HARQ-ACK of corresponding second SPS PDSCH, channel state information (CSI), and scheduling request (SR), and the second SPS PDSCH and the first SPS PDSCH correspond to the same SPS configuration, or correspond to different SPS configurations.

In an embodiment, the transmitting the first HARQ-ACK and the UCI simultaneously includes at least one of the following schemes:

in case that the UCI includes HARQ-ACK of the PDSCH with the corresponding physical downlink control channel (PDCCH), determining a PUCCH resource set based on a total number of bits of the first HARQ-ACK and the UCI, determining a PUCCH resource from the determined PUCCH resource set based on a PUCCH resource indication field in the PDCCH and transmitting the first HARQ-ACK and the UCI through the determined PUCCH resource simultaneously;

in case that the UCI includes only CSI, transmitting the first HARQ-ACK and the CSI simultaneously on a PUCCH resource corresponding to the CSI, or determining a PUCCH resource from PUCCH resources corresponding to SPS PDSCH based on a total number of bits of the first HARQ-ACK and the CSI, and transmitting the first HARQ-ACK and the CSI through the determined PUCCH resource simultaneously;

in case that the UCI includes only CSI and SR, transmitting the first HARQ-ACK, the CSI and the SR simultaneously on a PUCCH resource corresponding to the CSI, or determining a PUCCH resource from PUCCH resources corresponding to SPS PDSCH based on a total number of bits of the first HARQ-ACK, the CSI and the SR, and transmitting the first HARQ-ACK, the CSI and the SR through the determined PUCCH resource simultaneously;

in case that the UCI includes only SR, processing the first HARQ-ACK based on PUCCH formats used by the SR and the first HARQ-ACK, or determining a PUCCH resource from PUCCH resources corresponding to SPS PDSCH based on a total number of bits of the first HARQ-ACK and the SR, and transmitting the first HARQ-ACK and the SR through the determined PUCCH resource simultaneously; and in case that the UCI only includes the second HARQ-ACK corresponding to the second SPS PDSCH, determining a PUCCH resource from PUCCH resources corresponding to SPS PDSCH based on a total number of bits of the first HARQ-ACK and the second HARQ-ACK and transmitting the first HARQ-ACK and the second HARQ-ACK through the determined PUCCH resource simultaneously.

In an embodiment, the processing the first HARQ-ACK based on PUCCH formats used by the SR and the first HARQ-ACK includes:

in case that the PUCCH formats used by both the SR and the first HARQ-ACK is a first format, transmitting the first HARQ-ACK through the SR resource in case that the SR is positive, and transmitting the first HARQ-ACK through a PUCCH resource corresponding to the first SPS PDSCH in case that the SR is negative;

in case that the PUCCH format used by the first HARQ-ACK is a second format, transmitting the first HARQ-ACK through the PUCCH resource corresponding to the first SPS PDSCH, and a cyclic shift used in the first HARQ-ACK transmission is determined based on whether the SR is positive or negative;

in case that the PUCCH format used by the first HARQ-ACK is the first format and the PUCCH format used by the SR is the second format, discarding the SR and transmitting the first HARQ-ACK through the PUCCH resource corresponding to the first SPS PDSCH; and the first format is PUCCH format 1, and the second format is PUCCH format 0.

In an embodiment, in case that it is required to select a PUCCH resource from PUCCH resources corresponding to SPS based on a total number of bits of the HARQ-ACK corresponding to the SPS PDSCH, in case that an unavailable symbol is included in a symbol set corresponding to the selected PUCCH resource in the target time unit, the first HARQ-ACK is discarded, or the target time unit is used as the initial time unit, and a target time unit is determined again for transmitting the first HARQ-ACK.

In an embodiment, in case that the way 5 is adopted, the receiving the first HARQ-ACK in the target time unit includes:

in case that the UCI is defined as a HARQ-ACK, channel state information (CSI) and a scheduling request (SR), transmitting the first HARQ-ACK through the first PUCCH resource in the target time unit, or determining whether an unavailable symbol is included in a symbol set corresponding to the first PUCCH resource in the target time unit, discarding the first HARQ-ACK in case that the unavailable symbol is included, and transmitting the first HARQ-ACK through the first PUCCH resource in the target time unit in case that the unavailable symbol is not included; or in case that the UCI is defined as a HARQ-ACK corresponding to a second SPS PDSCH, channel state information (CSI) and a scheduling request (SR), in case that no HARQ-ACK transmission of the PDSCH with a corresponding PDCCH is present in the target time unit, transmitting the first HARQ-ACK through the first PUCCH resource, or determining whether an unavailable symbol is included in a symbol set corresponding to the first PUCCH resource in the target time unit, discarding the first HARQ-ACK in case that the unavailable symbol is included, and transmitting the first HARQ-ACK through the first PUCCH resource in the target time unit in case that the unavailable symbol is not included; and in case that the HARQ-ACK transmission of the PDSCH with a corresponding PDCCH is present in the target time unit, transmitting the first HARQ-ACK and the HARQ-ACK of the PDSCH with corresponding PDCCH simultaneously, and the second SPS PDSCH and the first SPS PDSCH correspond to the same SPS configuration, or correspond to different SPS configurations.

In an embodiment, in case that the way 6 is adopted, the receiving the first HARQ-ACK in the target time unit includes:

in case that the UCI is defined as a HARQ-ACK, channel state information (CSI) and a scheduling request (SR), and the PUCCH resource for carrying the first HARQ-ACK is the first PUCCH resource, transmitting the first HARQ-ACK through the first PUCCH resource in the target time unit; or in case that the UCI is defined as a HARQ-ACK corresponding to the second SPS PDSCH, channel state information (CSI) and a scheduling request (SR) and the PUCCH resource for carrying the first HARQ-ACK is the first PUCCH resource, in case that no HARQ-ACK transmission of the PDSCH with corresponding PDCCH is present in the target time unit, transmitting the first HARQ-ACK through the first PUCCH resource, and in case that a HARQ-ACK transmission of the PDSCH with a corresponding PDCCH is present in the target time unit, transmitting the first HARQ-ACK and the HARQ-ACK of the PDSCH with a corresponding PDCCH simultaneously, and the second SPS PDSCH and the first SPS PDSCH correspond to the same SPS configuration, or correspond to different SPS configurations.

In an embodiment, if the target time unit is not within a preset deferring range, the first HARQ-ACK is discarded.

In an embodiment, determining the initial time unit includes: determining the initial time unit based on a feedback timing of the HARQ-ACK corresponding to the first SPS PDSCH.

In an embodiment, the unavailable symbols include at least one of the following symbols: a downlink (DL) symbol configured by high layer signaling, a flexible (FL) symbol configured by high layer signaling, a symbol scheduled by downlink control information (DCI) for downlink transmission, a symbol indicated as DL or FL by DCI format A for indicating the time unit structure, a symbol occupied by GP, a symbol occupied by transmission of synchronization signal block (SSB), and a vacant symbol predetermined by a system.

In addition, the logic instructions in the memory 1030 described above may be implemented in the form of a software functional unit and may be stored in a computer readable storage medium while being sold or used as a separate product. Therefore, the embodiments of the present application provide a software product, which is stored in a storage medium including several instructions to cause a computer device (for example, a personal computer, server, or network device, etc.) to perform all or a part steps of the method described in various embodiments. The storage medium described above includes various media that can store program codes such as U disk, mobile hard disk, read-only memory (ROM), random access memory (RAM), magnetic disk, or optical disk.

Figure 11:
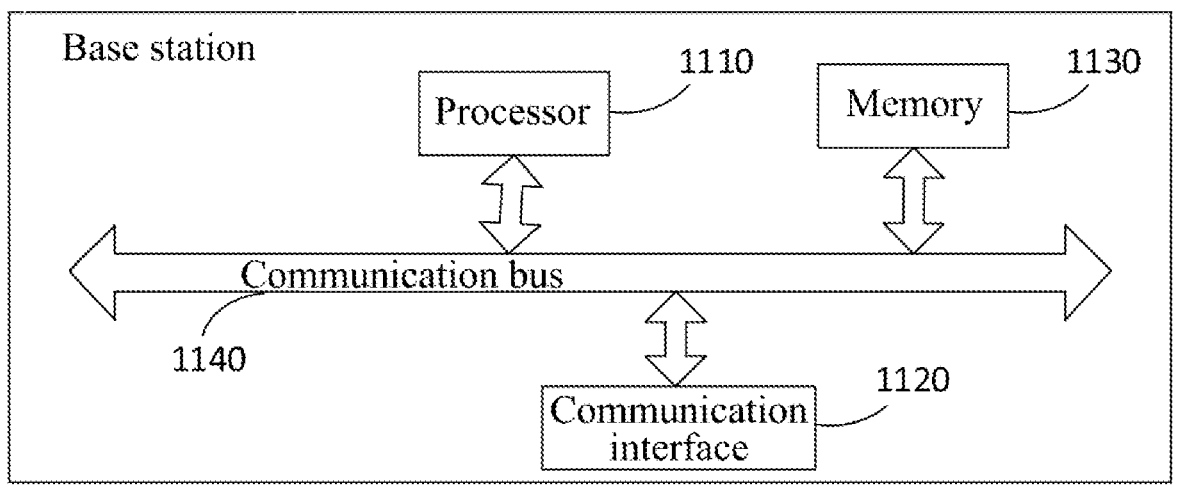
FIG. 11 is a schematic structural diagram showing a base station according to an embodiment of the present application.

In addition, referring to FIG. 11 showing a schematic structural diagram of a base station according to the present application. The terminal may include a processor 1110, a communication interface 1120, a memory 1130, and a communication bus 1140. The processor 1110, the communication interface 1120, and the memory 1130 communicate with each other through the communication bus 1140. The processor 1110 may invoke a computer program stored on the memory 1130 and executable on the processor 1110 to perform the following steps:

determining an initial time unit in which a first HARQ-ACK transmission of a first SPS PDSCH is present;

determining whether an unavailable symbol is included in a symbol set corresponding to a first PUCCH resource for carrying the first HARQ-ACK in the initial time unit; and deferring, in case that an unavailable symbol is included, the first HARQ-ACK to a target time unit and receiving the first HARQ-ACK in the target time.

In an embodiment, the method further includes determining the target time unit based on one of the following ways:

way 1: taking a time unit immediately subsequent to the initial time unit as the target time unit;

way 2: taking an earliest time unit in which a UCI transmission occurs subsequent to the initial time unit as the target time unit; or, taking an earliest time unit in which a UCI transmission overlapping with the first PUCCH resource occurs subsequent to the initial time unit as the target time unit;

way 3: taking an earliest time unit in which a second HARQ-ACK corresponding to a second SPS PDSCH is transmitted subsequent to the initial time unit as the target time unit, and the second SPS PDSCH and the first SPS PDSCH correspond to a same SPS configuration, or correspond to different SPS configurations;

way 4: taking an earliest time unit subsequent to the initial time unit, which satisfies that an unavailable symbol is not included in a PUCCH resource for carrying the first HARQ-ACK, as the target time unit;

way 5: taking an earliest time unit in which no UCI transmission is present subsequent to the initial time unit as the target time unit; or, taking an earliest time unit in which no UCI transmission overlapping with the first PUCCH resource is present subsequent to the initial time unit as the target time unit; and way 6: taking an earliest time unit subsequent to the initial time unit, which satisfies that a UCI transmission is absent and an unavailable symbol is not included in a PUCCH resource for carrying the first HARQ-ACK, as the target time unit; or, taking an earliest time unit subsequent to the initial time unit, which satisfies that no UCI transmission overlapping with the first PUCCH resource is present and an unavailable symbol is not included in the PUCCH resource for carrying the first HARQ-ACK, as the target time unit.

In an embodiment, in case that the way 1 is adopted, the receiving the first HARQ-ACK in the target time unit includes:
  in case that the UCI transmission or the UCI transmission overlapping with the first PUCCH resource is present in the target time unit, receiving the first HARQ-ACK and the UCI in the target time unit simultaneously;
  in case that the UCI transmission or the UCI transmission overlapping with the first PUCCH resource is absent in the target time unit, adopting one of the following schemes:
  scheme 1: determining that the first HARQ-ACK is discarded;
  scheme 2: receiving the first HARQ-ACK through the first PUCCH resource in the target time unit; and
  scheme 3: determining whether an unavailable symbol is included in a symbol set corresponding to a first PUCCH resource in the target time unit; and determining that the first HARQ-ACK is discarded; in case that the unavailable symbol is included and receiving the first HARQ-ACK through the first PUCCH resource in the target time unit in case that the unavailable symbol is not included.

In an embodiment, in case that the way 2 is adopted, the receiving the first HARQ-ACK in the target time unit includes:
  receiving the first HARQ-ACK and the UCI simultaneously in the target time unit.

In an embodiment, in case that the way 3 is adopted, the receiving the first HARQ-ACK in the target time unit includes:
  selecting, based on a total number of bits of the first HARQ-ACK and the second HARQ-ACK, a PUCCH resource from PUCCH resources corresponding to SPS PDSCH, and receiving the first HARQ-ACK and the second HARQ-ACK simultaneously on the selected PUCCH resource.

In an embodiment, in case that the way 4 is adopted, the processing the first HARQ-ACK in the target time unit includes one of the following:
  scheme A: in case that the PUCCH resource for carrying the first HARQ-ACK is the first PUCCH resource, the receiving the first HARQ-ACK in the target time unit includes:
  receiving the first HARQ-ACK through the PUCCH resource in the target time unit; and
  scheme B: in case that the PUCCH resource for carrying the first HARQ-ACK is a PUCCH resource that is determined from PUCCH resources corresponding to SPS PDSCH based on a total number of bits of the first HARQ-ACK and the second HARQ-ACK corresponding to the second SPS PDSCH, the receiving the first HARQ-ACK in the target time unit includes:
  receiving the first HARQ-ACK and the second HARQ-ACK on the PUCCH resource simultaneously; and the second SPS PDSCH and the first SPS PDSCH correspond to the same SPS configuration, or correspond to different SPS configurations;
  scheme C: in case that the PUCCH resource for carrying the first HARQ-ACK is a PUCCH resource for transmitting the UCI, the receiving the first HARQ-ACK in the target time unit includes: simultaneously receiving the first HARQ-ACK and the UCI on the PUCCH resource.

In an embodiment, the UCI includes at least one of the following information: HARQ-ACK of PDSCH with corresponding PDCCH, HARQ-ACK of corresponding second SPS PDSCH, channel state information (CSI), and scheduling request (SR), and the second SPS PDSCH and the first SPS PDSCH correspond to the same SPS configuration, or correspond to different SPS configurations.

In an embodiment, the receiving the first HARQ-ACK and the UCI simultaneously includes at least one of the following schemes:
  in case that the UCI includes HARQ-ACK of the PDSCH with the corresponding physical downlink control channel (PDCCH), determining a PUCCH resource set based on a total number of bits of the first HARQ-ACK and the UCI, determining a PUCCH resource from the determined PUCCH resource set based on a PUCCH resource indication field in the PDCCH and receiving the first HARQ-ACK and the UCI through the determined PUCCH resource simultaneously;
  in case that the UCI includes only CSI, receiving the first HARQ-ACK and the CSI simultaneously on a PUCCH resource corresponding to the CSI, or determining a PUCCH resource from PUCCH resources corresponding to SPS PDSCH based on a total number of bits of the first HARQ-ACK and the CSI, and receiving the first HARQ-ACK and the CSI through the determined PUCCH resource simultaneously;
  in case that the UCI includes only CSI and SR, receiving the first HARQ-ACK, the CSI and the SR simultaneously on a PUCCH resource corresponding to the CSI, or determining a PUCCH resource from PUCCH resources corresponding to SPS PDSCH based on a total number of bits of the first HARQ-ACK, the CSI and the SR, and receiving the first HARQ-ACK, the CSI and the SR through the determined PUCCH resource simultaneously;
  in case that the UCI includes only SR, receiving the first HARQ-ACK based on transmission schemes corresponding to different combinations of PUCCH formats used by SR and the first HARQ-ACK, or determining a PUCCH resource from PUCCH resources corresponding to SPS PDSCH based on a total number of bits of the first HARQ-ACK and the SR, and receiving the first HARQ-ACK and the SR through the determined PUCCH resource simultaneously; and
  in case that the UCI only includes the second HARQ-ACK corresponding to the second SPS PDSCH, determining a PUCCH resource from PUCCH resources corresponding to SPS PDSCH based on a total number of bits of the first HARQ-ACK and the second HARQ-ACK and receiving the first HARQ-ACK and the second HARQ-ACK through the determined PUCCH resource simultaneously.

In an embodiment, the receiving the first HARQ-ACK based on transmission schemes corresponding to SR and different combinations of PUCCH formats used by the first HARQ-ACK includes:
  in case that the PUCCH formats used by both the SR and the first HARQ-ACK is the first format, determining that the SR is positive in case that the first HARQ-ACK is received through the SR resource and determining that the SR is negative in case that the first HARQ-ACK is received through the PUCCH resource corresponding to the first SPS PDSCH;

in case that the PUCCH format used by the first HARQ-ACK is a second format, receiving the first HARQ-ACK through the PUCCH resource corresponding to the first SPS PDSCH, and whether SR is positive or negative is determined based on the cyclic shift used in receiving the first HARQ-ACK;

in case that the PUCCH format used by the first HARQ-ACK is the first format and the PUCCH format used by the SR is the second format, determining that the SR is discarded and receiving the first HARQ-ACK through the PUCCH resource corresponding to the first SPS PDSCH; and the first format is PUCCH format 1, and the second format is PUCCH format 0.

In an embodiment, in case that it is required to select a PUCCH resource from PUCCH resources corresponding to SPS based on a total number of bits of the HARQ-ACK corresponding to the SPS PDSCH, in case that an unavailable symbol is included in a symbol set corresponding to the selected PUCCH resource in the target time unit, it is determined that the first HARQ-ACK is discarded, or the target time unit is used as the initial time unit, and a target time unit is determined again for receiving the first HARQ-ACK.

In an embodiment, in case that the way 5 is adopted, the receiving the first HARQ-ACK in the target time unit includes:

in case that the UCI is defined as a HARQ-ACK, channel state information (CSI) and a scheduling request (SR), receiving the first HARQ-ACK through the first PUCCH resource in the target time unit, or determining whether an unavailable symbol is included in a symbol set corresponding to the first PUCCH resource in the target time unit and then determining that the first HARQ-ACK is discarded in case that the unavailable symbol is included, and receiving the first HARQ-ACK through the first PUCCH resource in the target time unit in case that the unavailable symbol is not included; or in case that the UCI is defined as a HARQ-ACK corresponding to a second SPS PDSCH, channel state information (CSI) and a scheduling request (SR), in case that no HARQ-ACK transmission of the PDSCH with a corresponding PDCCH is present in the target time unit, receiving the first HARQ-ACK through the first PUCCH resource, or determining whether an unavailable symbol is included in a symbol set corresponding to the first PUCCH resource in the target time unit, and determining that the first HARQ-ACK is discarded in case that the unavailable symbol is included, and receiving the first HARQ-ACK through the first PUCCH resource in the target time unit in case that the unavailable symbol is not included; and in case that the HARQ-ACK transmission of the PDSCH with the corresponding PDCCH is present in the target time unit, receiving the first HARQ-ACK and the HARQ-ACK of the PDSCH with corresponding PDCCH simultaneously, and the second SPS PDSCH and the first SPS PDSCH correspond to the same SPS configuration, or correspond to different SPS configurations.

In an embodiment, in case that the way 6 is adopted, the receiving the first HARQ-ACK in the target time unit includes:

in case that the UCI is defined as a HARQ-ACK, channel state information (CSI) and a scheduling request (SR), and the PUCCH resource being the first PUCCH resource, receiving the first HARQ-ACK through the first PUCCH resource in the target time unit; or in case that the UCI is defined as a HARQ-ACK corresponding to the second SPS PDSCH, channel state information (CSI) and a scheduling request (SR), the PUCCH resource being the first PUCCH resource, in case that no HARQ-ACK transmission of the PDSCH with corresponding PDCCH is present in the target time unit, receiving the first HARQ-ACK through the first PUCCH resource, and in case that a HARQ-ACK transmission of the PDSCH with corresponding PDCCH is present in the target time unit, receiving the first HARQ-ACK and the HARQ-ACK of the PDSCH with a corresponding PDCCH simultaneously, and the second SPS PDSCH and the first SPS PDSCH correspond to the same SPS configuration, or correspond to different SPS configurations.

In an embodiment, if the target time unit is not within a preset deferring range, it is determined that the first HARQ-ACK is discarded.

In an embodiment, determining the initial time unit includes: determining the initial time unit based on a feedback timing of the HARQ-ACK corresponding to the first SPS PDSCH.

In an embodiment, the unavailable symbols include at least one of the following symbols: a downlink (DL) symbol configured by high layer signaling, a flexible (FL) symbol configured by high layer signaling, a symbol scheduled by downlink control information (DCI) for downlink transmission, a symbol indicated as DL or FL by DCI format A for indicating the time unit structure, a symbol occupied by GP, a symbol occupied by transmission of synchronization signal block (SSB), and a vacant symbol predetermined by a system.

In addition, the logic instructions in the memory 1130 described above may be implemented in the form of a software functional unit and may be stored in a computer readable storage medium while being sold or used as a separate product. Therefore, the embodiments of the present application provide a software product, which is stored in a storage medium including several instructions to cause a computer device (for example, a personal computer, server, or network device, etc.) to perform all or a part steps of the method described in various embodiments. The storage medium described above includes various media that can store program codes such as U disk, mobile hard disk, read-only memory (ROM), random access memory (RAM), magnetic disk, or optical disk.

The present application provides a non-transitory computer-readable storage medium having stored thereon computer programs, in case that executed by the processor, the computer programs are configured to implement the steps of the method mentioned above according to the embodiments.

The device embodiments described above are merely illustrative, and the units described as separate components may or may not be physically separate, and the components displayed as units may or may not be physical units, that is, may be located at the same place, or it can be distributed to multiple network units. Some or all of the modules may be selected according to actual needs to achieve the purpose of the solution of the present embodiment.

Embodiments can be implemented by means of software and a necessary general hardware platform, and of course, by hardware. Therefore, the embodiments of the present application provide a software product, which is stored in a storage medium such as ROM/RAM, magnetic Discs, optical discs, etc., including several instructions to cause a computer device (for example, a personal computer, server, or network device, etc.) to perform various embodiments or a part of the methods described in various embodiments.

What is claimed is:

1. A method for processing a hybrid automatic repeat request (HARQ) of a semi-persistent scheduling (SPS) physical downlink shared channel (PDSCH), performed by a terminal, comprising:

determining an initial time unit in which a first hybrid automatic repeat request-acknowledge (HARQ-ACK) transmission of a first SPS PDSCH is present;

determining whether an unavailable symbol is included in a symbol set corresponding to a first physical uplink control channel (PUCCH) resource for carrying the first HARQ-ACK in the initial time unit; and deferring, in case that the unavailable symbol is included, the first HARQ-ACK to a target time unit and processing the first HARQ-ACK in the target time unit;

the method further comprises: determining the target time unit through one of the following ways:

taking an earliest time unit in which an uplink control information (UCI) transmission occurs subsequent to the initial time unit as the target time unit; or, taking an earliest time unit in which a UCI transmission overlapping with a PUCCH resource for carrying the first HARQ-ACK occurs subsequent to the initial time unit as the target time unit;

taking an earliest time unit subsequent to the initial time unit, which satisfies that the unavailable symbol is not included in a PUCCH resource for carrying the first HARQ-ACK, as the target time unit;

taking an earliest time unit in which no uplink control information (UCI) transmission is present subsequent to the initial time unit as the target time unit; or, taking an earliest time unit in which no UCI transmission overlapping with a PUCCH resource for carrying the first HARQ-ACK is present subsequent to the initial time unit as the target time unit; or taking an earliest time unit subsequent to the initial time unit, which satisfies that an uplink control information (UCI) transmission is absent and the unavailable symbol is not included in a PUCCH resource for carrying the first HARQ-ACK, as the target time unit; or, taking an earliest time unit subsequent to the initial time unit, which satisfies that no UCI transmission overlapping with a PUCCH resource for carrying the first HARQ-ACK is present and the unavailable symbol is not included in the PUCCH resource for carrying the first HARQ-ACK, as the target time unit.

2. The method of claim 1, wherein in case of taking an earliest time unit in which a UCI transmission occurs subsequent to the initial time unit as the target time unit; or, taking an earliest time unit in which a UCI transmission overlapping with a PUCCH resource for carrying the first HARQ-ACK occurs subsequent to the initial time unit as the target time unit, the processing the first HARQ-ACK in the target time unit comprises:

transmitting the first HARQ-ACK and the UCI simultaneously in the target time unit; or in case of taking an earliest time unit in which no UCI transmission is present subsequent to the initial time unit as the target time unit; or, taking an earliest time unit in which no UCI transmission overlapping with a PUCCH resource for carrying the first HARQ-ACK is present subsequent to the initial time unit as the target time unit, the processing the first HARQ-ACK in the target time unit comprises:

in case that the UCI is defined as at least one of a HARQ-ACK, channel state information (CSI) or a scheduling request (SR), transmitting the first HARQ-ACK through the first PUCCH resource in the target time unit, or determining whether the unavailable symbol is included in a symbol set corresponding to the first PUCCH resource in the target time unit, discarding the first HARQ-ACK in case that the unavailable symbol is included, and transmitting the first HARQ-ACK through the first PUCCH resource in the target time unit in case that the unavailable symbol is not included; or in case that the UCI is defined as at least one of a HARQ-ACK corresponding to a second SPS PDSCH, channel state information (CSI) or a scheduling request (SR), in case that no HARQ-ACK transmission of the PDSCH with corresponding physical downlink control channel (PDCCH) is present in the target time unit, transmitting the first HARQ-ACK through the first PUCCH resource, or determining whether the unavailable symbol is included in a symbol set corresponding to the first PUCCH resource in the target time unit, discarding the first HARQ-ACK in case that the unavailable symbol is included, and transmitting the first HARQ-ACK through the first PUCCH resource in the target time unit in case that the unavailable symbol is not included; or in case that the HARQ-ACK transmission of the PDSCH with corresponding PDCCH is present in the target time unit, transmitting the first HARQ-ACK and the HARQ-ACK of the PDSCH with corresponding PDCCH simultaneously, wherein the second SPS PDSCH and the first SPS PDSCH correspond to the same SPS configuration, or correspond to different SPS configurations; or in case of taking an earliest time unit subsequent to the initial time unit, which satisfies that a UCI transmission is absent and the unavailable symbol is not included in a PUCCH resource for carrying the first HARQ-ACK, as the target time unit; or, taking an earliest time unit subsequent to the initial time unit, which satisfies that no UCI transmission overlapping with a PUCCH resource for carrying the first HARQ-ACK is present and the unavailable symbol is not included in the PUCCH resource for carrying the first HARQ-ACK, as the target time unit, the processing the first HARQ-ACK in the target time unit comprises:

in case that the UCI is defined as at least one of a HARQ-ACK, channel state information (CSI) or a scheduling request (SR), and the PUCCH resource for carrying the first HARQ-ACK is the first PUCCH resource, transmitting the first HARQ-ACK through the first PUCCH resource in the target time unit; or in case that the UCI is defined as at least one of a HARQ-ACK corresponding to a second SPS PDSCH, channel state information (CSI) or a scheduling request (SR) and the PUCCH resource for carrying the first HARQ-ACK is the first PUCCH resource, in case that no HARQ-ACK transmission of the PDSCH with corresponding physical downlink control channel (PDCCH) is present in the target time unit, transmitting the first HARQ-ACK through the first PUCCH resource, or in case that a HARQ-ACK transmission of the PDSCH with corresponding PDCCH is present in the target time unit, transmitting the first HARQ-ACK and the HARQ-ACK of the PDSCH with corresponding PDCCH simultaneously, wherein the second SPS PDSCH and the first SPS PDSCH correspond to the same SPS configuration, or correspond to different SPS configurations.

3. The method of claim 2, wherein in case that it is required to select a PUCCH resource from PUCCH resources corresponding to SPS based on a total number of bits of the HARQ-ACK corresponding to the SPS PDSCH, discarding the first HARQ-ACK in case that the unavailable symbol is included in a symbol set corresponding to the selected PUCCH resource in the target time unit, or taking the target time unit as the initial time unit, and determining another target time unit for transmitting the first HARQ-ACK.

4. The method of claim 1, wherein in case that the target time unit is not within a preset deferring range, the first HARQ-ACK is discarded.

5. A method for processing a hybrid automatic repeat request (HARQ) of a semi-persistent scheduling (SPS) physical downlink shared channel (PDSCH), performed by a base station, comprising:
determining an initial time unit in which a first hybrid automatic repeat request-acknowledge (HARQ-ACK) transmission of a first SPS PDSCH is present;
determining whether an unavailable symbol is included in a symbol set corresponding to a first physical uplink control channel (PUCCH) resource for carrying the first HARQ-ACK in the initial time unit; and
determining that, in case that the unavailable symbol is included, the first HARQ-ACK is deferred to a target time unit, and processing the first HARQ-ACK in the target time unit;
the method further comprises: determining the target time unit through one of the following ways:
taking an earliest time unit in which an uplink control information (UCI) transmission occurs subsequent to the initial time unit as the target time unit; or, taking an earliest time unit in which a UCI transmission overlapping with a PUCCH resource for carrying the first HARQ-ACK occurs subsequent to the initial time unit as the target time unit;
taking an earliest time unit subsequent to the initial time unit, which satisfies that the unavailable symbol is not included in a PUCCH resource for carrying the first HARQ-ACK, as the target time unit;
taking an earliest time unit in which no uplink control information (UCI) transmission is present subsequent to the initial time unit as the target time unit; or, taking an earliest time unit in which no UCI transmission overlapping with a PUCCH resource for carrying the first HARQ-ACK is present subsequent to the initial time unit as the target time unit; or
taking an earliest time unit subsequent to the initial time unit, which satisfies that an uplink control information (UCI) transmission is absent and the unavailable symbol is not included in a PUCCH resource for carrying the first HARQ-ACK, as the target time unit; or, taking an earliest time unit subsequent to the initial time unit, which satisfies that no UCI transmission overlapping with a PUCCH resource for carrying the first HARQ-ACK is present and the unavailable symbol is not included in the PUCCH resource for carrying the first HARQ-ACK, as the target time unit.

6. The method of claim 5, wherein
in case of taking an earliest time unit in which a UCI transmission occurs subsequent to the initial time unit as the target time unit; or, taking an earliest time unit in which a UCI transmission overlapping with a PUCCH resource for carrying the first HARQ-ACK occurs subsequent to the initial time unit as the target time unit, the processing the first HARQ-ACK in the target time unit comprises:
receiving the first HARQ-ACK and the UCI simultaneously in the target time unit; or
in case of taking an earliest time unit in which no UCI transmission is present subsequent to the initial time unit as the target time unit; or, taking an earliest time unit in which no UCI transmission overlapping with a PUCCH resource for carrying the first HARQ-ACK is present subsequent to the initial time unit as the target time unit, the processing the first HARQ-ACK in the target time unit comprises:
in case that the UCI is defined as at least one of a HARQ-ACK, channel state information (CSI) or a scheduling request (SR), receiving the first HARQ-ACK through the first PUCCH resource in the target time unit, or determining whether the unavailable symbol is included in a symbol set corresponding to the first PUCCH resource in the target time unit, and determining that the first HARQ-ACK is discarded in case that the unavailable symbol is included, and receiving the first HARQ-ACK through the first PUCCH resource in the target time unit in case that the unavailable symbol is not included; or
in case that the UCI is defined as at least one of a HARQ-ACK corresponding to a second SPS PDSCH, channel state information (CSI) or a scheduling request (SR), in case that no HARQ-ACK transmission of the PDSCH with corresponding physical downlink control channel (PDCCH) is present in the target time unit, receiving the first HARQ-ACK through the first PUCCH resource, or determining whether the unavailable symbol is included in a symbol set corresponding to the first PUCCH resource in the target time unit, and determining that the first HARQ-ACK is discarded in case that the unavailable symbol is included, and receiving the first HARQ-ACK through the first PUCCH resource in the target time unit in case that the unavailable symbol is not included; or in case that the HARQ-ACK transmission of the PDSCH with corresponding PDCCH is present in the target time unit, receiving the first HARQ-ACK and the HARQ-ACK of the PDSCH with corresponding PDCCH simultaneously, wherein the second SPS PDSCH and the first SPS PDSCH correspond to the same SPS configuration, or correspond to different SPS configurations; or
in case of taking an earliest time unit subsequent to the initial time unit, which satisfies that a UCI transmission is absent and the unavailable symbol is not included in a PUCCH resource for carrying the first HARQ-ACK, as the target time unit; or, taking an earliest time unit subsequent to the initial time unit, which satisfies that no UCI transmission overlapping with a PUCCH resource for carrying the first HARQ-ACK is present and the unavailable symbol is not included in the PUCCH resource for carrying the first HARQ-ACK, as the target time unit, the processing the first HARQ-ACK in the target time unit comprises:
in case that the UCI is defined as at least one of a HARQ-ACK, channel state information (CSI) or a scheduling request (SR), and the PUCCH resource for carrying the first HARQ-ACK is the first PUCCH resource, receiving the first HARQ-ACK through the first PUCCH resource in the target time unit; or in case that the UCI is defined as at least one of a HARQ-ACK corresponding to a second SPS PDSCH, channel state information (CSI) or a scheduling request (SR), and the PUCCH resource for carrying the first HARQ-ACK is the first PUCCH resource, in case that no HARQ-ACK transmission of the PDSCH with corresponding physical downlink control channel (PDCCH) is present in the target time unit, receiving the first HARQ-ACK through the first PUCCH resource, or in case that a HARQ-ACK transmission of the PDSCH with corresponding PDCCH is present in the target time unit, receiving the first HARQ-ACK and the HARQ-ACK of the PDSCH with corresponding PDCCH simultaneously, wherein the second SPS PDSCH and the first SPS PDSCH correspond to the same SPS configuration, or correspond to different SPS configurations.

7. The method of claim 6, wherein in case that it is required to select a PUCCH resource from PUCCH resources corresponding to SPS based on a total number of bits of the HARQ-ACK corresponding to the SPS PDSCH, in case that the unavailable symbol is included in a symbol set corresponding to the selected PUCCH resource in the target time unit, determining that the first HARQ-ACK is discarded, or the target time unit is used as the initial time unit, and another target time unit is determined for receiving the first HARQ-ACK.

8. The method of claim 5, wherein in case that the target time unit is not within a preset deferring range, it is determined that the first HARQ-ACK is discarded.

9. A terminal, comprising:
a processor; and
a memory storing programs that are executable by the processor, wherein the programs are executed by the processor to implement the following steps:
determining an initial time unit in which a first hybrid automatic repeat request-acknowledge (HARQ-ACK) transmission of a first semi-persistent scheduling (SPS) physical downlink shared channel (PDSCH) is present;
determining whether an unavailable symbol is included in a symbol set corresponding to a first physical uplink control channel (PUCCH) resource for carrying the first HARQ-ACK in the initial time unit; and
deferring, in case that the unavailable symbol is included, the first HARQ-ACK to a target time unit and processing the first HARQ-ACK in the target time unit;
wherein the steps further comprise: determining the target time unit through one of the following ways:
taking an earliest time unit in which an uplink control information (UCI) transmission occurs subsequent to the initial time unit as the target time unit; or, taking an earliest time unit in which a UCI transmission overlapping with a PUCCH resource for carrying the first HARQ-ACK occurs subsequent to the initial time unit as the target time unit;
taking an earliest time unit subsequent to the initial time unit, which satisfies that the unavailable symbol is not included in a PUCCH resource for carrying the first HARQ-ACK, as the target time unit;
taking an earliest time unit in which no uplink control information (UCI) transmission is present subsequent to the initial time unit as the target time unit; or, taking an earliest time unit in which no UCI transmission overlapping with a PUCCH resource for carrying the first HARQ-ACK is present subsequent to the initial time unit as the target time unit; or taking an earliest time unit subsequent to the initial time unit, which satisfies that an uplink control information (UCI) transmission is absent and the unavailable symbol is not included in a PUCCH resource for carrying the first HARQ-ACK, as the target time unit; or, taking an earliest time unit subsequent to the initial time unit, which satisfies that no UCI transmission overlapping with a PUCCH resource for carrying the first HARQ-ACK is present and the unavailable symbol is not included in the PUCCH resource for carrying the first HARQ-ACK, as the target time unit.

10. The terminal of claim 9, wherein
in case of taking an earliest time unit in which a UCI transmission occurs subsequent to the initial time unit as the target time unit; or, taking an earliest time unit in which a UCI transmission overlapping with a PUCCH resource for carrying the first HARQ-ACK occurs subsequent to the initial time unit as the target time unit, the processing the first HARQ-ACK in the target time unit comprises:
transmitting the first HARQ-ACK and the UCI simultaneously in the target time unit; or
in case of taking an earliest time unit in which no UCI transmission is present subsequent to the initial time unit as the target time unit; or, taking an earliest time unit in which no UCI transmission overlapping with a PUCCH resource for carrying the first HARQ-ACK is present subsequent to the initial time unit as the target time unit, the processing the first HARQ-ACK in the target time unit comprises:
in case that the UCI is defined as at least one of a HARQ-ACK, channel state information (CSI) or a scheduling request (SR), transmitting the first HARQ-ACK through the first PUCCH resource in the target time unit, or determining whether the unavailable symbol is included in a symbol set corresponding to the first PUCCH resource in the target time unit, discarding the first HARQ-ACK in case that the unavailable symbol is included, and transmitting the first HARQ-ACK through the first PUCCH resource in the target time unit in case that the unavailable symbol is not included; or
in case that the UCI is defined as at least one of a HARQ-ACK corresponding to a second SPS PDSCH, channel state information (CSI) or a scheduling request (SR), in case that no HARQ-ACK transmission of the PDSCH with corresponding physical downlink control channel (PDCCH) is present in the target time unit, transmitting the first HARQ-ACK through the first PUCCH resource, or determining whether the unavailable symbol is included in a symbol set corresponding to the first PUCCH resource in the target time unit, discarding the first HARQ-ACK in case that the unavailable symbol is included, and transmitting the first HARQ-ACK through the first PUCCH resource in the target time unit in case that the unavailable symbol is not included; or in case that the HARQ-ACK transmission of the PDSCH with corresponding PDCCH is present in the target time unit, transmitting the first HARQ-ACK and the HARQ-ACK of the PDSCH with corresponding PDCCH simultaneously, wherein the second SPS PDSCH and the first SPS PDSCH correspond to the same SPS configuration, or correspond to different SPS configurations; or
in case of taking an earliest time unit subsequent to the initial time unit, which satisfies that a UCI transmission is absent and the unavailable symbol is not included in a PUCCH resource for carrying the first HARQ-ACK, as the target time unit; or, taking an earliest time unit subsequent to the initial time unit, which satisfies that no UCI transmission overlapping with a PUCCH resource for carrying the first HARQ-ACK is present and the unavailable symbol is not included in the PUCCH resource for carrying the first HARQ-ACK, as the target time unit, the processing the first HARQ-ACK in the target time unit comprises:

in case that the UCI is defined as at least one of a HARQ-ACK, channel state information (CSI) or a scheduling request (SR), and the PUCCH resource for carrying the first HARQ-ACK is the first PUCCH resource, transmitting the first HARQ-ACK through the first PUCCH resource in the target time unit; or in case that the UCI is defined as at least one of a HARQ-ACK corresponding to the second SPS PDSCH, channel state information (CSI) or a scheduling request (SR) and the PUCCH resource for carrying the first HARQ-ACK is the first PUCCH resource, in case that no HARQ-ACK transmission of the PDSCH with corresponding physical downlink control channel (PDCCH) is present in the target time unit, transmitting the first HARQ-ACK through the first PUCCH resource, or in case that a HARQ-ACK transmission of the PDSCH with corresponding PDCCH is present in the target time unit, transmitting the first HARQ-ACK and the HARQ-ACK of the PDSCH with corresponding PDCCH simultaneously, wherein the second SPS PDSCH and the first SPS PDSCH correspond to the same SPS configuration, or correspond to different SPS configurations.

11. The terminal of claim 10, wherein in case that it is required to select a PUCCH resource from PUCCH resources corresponding to SPS based on a total number of bits of the HARQ-ACK corresponding to the SPS PDSCH, discarding the first HARQ-ACK in case that the unavailable symbol is included in a symbol set corresponding to the selected PUCCH resource in the target time unit, or taking the target time unit as the initial time unit, and determining another target time unit for transmitting the first HARQ-ACK.

12. The terminal of claim 9, wherein in case that the target time unit is not within a preset deferring range, the first HARQ-ACK is discarded.

13. A base station, comprising:
a processor; and
a memory storing programs that are executable by the processor, wherein the programs are executed by the processor to implement steps of claim 5.

14. The method of claim 1, comprising at least one of the following:

in case that the PUCCH resource for carrying the first HARQ-ACK is the first PUCCH resource, the processing the first HARQ-ACK in the target time unit comprises: transmitting the first HARQ-ACK through the PUCCH resource for carrying the first HARQ-ACK in the target time unit;

in case that the PUCCH resource for carrying the first HARQ-ACK is a PUCCH resource that is determined from PUCCH resources corresponding to the SPS PDSCH based on a total number of bits of the first HARQ-ACK and a second HARQ-ACK corresponding to a second SPS PDSCH, the processing the first HARQ-ACK in the target time unit comprises: transmitting the first HARQ-ACK and the second HARQ-ACK on the PUCCH resource simultaneously, wherein the second SPS PDSCH and the first SPS PDSCH correspond to the same SPS configuration, or correspond to different SPS configurations, and the second HARQ-ACK of the second SPS PDSCH is transmitted in the target time unit; or in case that the PUCCH resource for carrying the first HARQ-ACK is a PUCCH resource for simultaneously transmitting the UCI and the first HARQ-ACK, the processing the first HARQ-ACK in the target time unit comprises: simultaneously transmitting the first HARQ-ACK and the UCI on the PUCCH resource.

15. The method of claim 5, comprising at least one of the following:

in case that the PUCCH resource for carrying the first HARQ-ACK is the first PUCCH resource, the processing the first HARQ-ACK in the target time unit comprises: receiving the first HARQ-ACK through the PUCCH resource for carrying the first HARQ-ACK in the target time unit;

in case that the PUCCH resource for carrying the first HARQ-ACK is a PUCCH resource that is determined from PUCCH resources corresponding to the SPS PDSCH based on a total number of bits of the first HARQ-ACK and a second HARQ-ACK corresponding to a second SPS PDSCH, the processing the first HARQ-ACK in the target time unit comprises: receiving the first HARQ-ACK and the second HARQ-ACK on the PUCCH resource simultaneously; wherein the second SPS PDSCH and the first SPS PDSCH correspond to the same SPS configuration, or correspond to different SPS configurations, and the second HARQ-ACK of the second SPS PDSCH is transmitted in the target time unit; or in case that the PUCCH resource for carrying the first HARQ-ACK is a PUCCH resource for simultaneously transmitting the UCI and the first HARQ-ACK, the processing the first HARQ-ACK in the target time unit comprises: simultaneously receiving the first HARQ-ACK and the UCI on the PUCCH resource.

16. The terminal of claim 9, wherein the steps comprises at least one of the following:

in case that the PUCCH resource for carrying the first HARQ-ACK is the first PUCCH resource, the processing the first HARQ-ACK in the target time unit comprises: transmitting the first HARQ-ACK through the PUCCH resource for carrying the first HARQ-ACK in the target time unit;

in case that the PUCCH resource for carrying the first HARQ-ACK is a PUCCH resource that is determined from PUCCH resources corresponding to the SPS PDSCH based on a total number of bits of the first HARQ-ACK and a second HARQ-ACK corresponding to a second SPS PDSCH, the processing the first HARQ-ACK in the target time unit comprises: transmitting the first HARQ-ACK and the second HARQ-ACK on the PUCCH resource simultaneously, wherein the second SPS PDSCH and the first SPS PDSCH correspond to the same SPS configuration, or correspond to different SPS configurations, and the second HARQ-ACK of the second SPS PDSCH is transmitted in the target time unit; or in case that the PUCCH resource for carrying the first HARQ-ACK is a PUCCH resource for simultaneously transmitting the UCI and the first HARQ-ACK, the processing the first HARQ-ACK in the target time unit comprises: simultaneously transmitting the first HARQ-ACK and the UCI on the PUCCH resource.

\* \* \* \* \*